US012809724B2

(12) United States Patent
Li

(10) Patent No.: US 12,809,724 B2
(45) Date of Patent: Nov. 24, 2026

(54) DATA STORAGE METHOD, SINGLE-NODE SERVER, AND DEVICE

(71) Applicant: BOE Technology Group Co., Ltd., Beijing (CN)

(72) Inventor: Qi Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 12 days.

(21) Appl. No.: 18/862,025

(22) PCT Filed: Apr. 27, 2023

(86) PCT No.: PCT/CN2023/091389
§ 371 (c)(1),
(2) Date: Oct. 31, 2024

(87) PCT Pub. No.: WO2024/001494
PCT Pub. Date: Jan. 4, 2024

(65) Prior Publication Data

US 2025/0181458 A1 Jun. 5, 2025

(30) Foreign Application Priority Data

Jun. 29, 2022 (CN) ......................... 202210762767.2

(51) Int. Cl.
*G06F 11/1446* (2026.01)

(52) U.S. Cl.
CPC ...... *G06F 11/1464* (2013.01); *G06F 11/1451* (2013.01); *G06F 11/1469* (2013.01)

(58) Field of Classification Search
CPC ............. G06F 11/1464; G06F 11/1451; G06F 11/1469; G06F 3/0619; G06F 3/0644; G06F 3/0689; G06F 11/1448; G06F 11/1458

(Continued)

(56) References Cited

U.S. PATENT DOCUMENTS

2009/0144568 A1* 6/2009 Fung ........................ G06F 1/324 713/300
2013/0282976 A1* 10/2013 Dubnicki ............ G06F 11/1456 711/112

(Continued)

FOREIGN PATENT DOCUMENTS

CN 103177111 A 6/2013
CN 108628539 A 10/2018

(Continued)

OTHER PUBLICATIONS

PCT/CN2023/091389 International Search Report issued on Aug. 2, 2023.

*Primary Examiner* — Yair Leibovich
(74) *Attorney, Agent, or Firm* — IPro, PLLC

(57) ABSTRACT

The present disclosure provides a data storage method, a single-node server, and a device. The method includes: obtaining storage parameters of at least one single-node server, wherein the storage parameters represent parameters used when slicing processing and encoding processing are performed on original data to be stored; according to the storage parameters of the single-node server, determining N first data blocks and M second data blocks which are obtained after said original data is processed, wherein any N data blocks in the N first data blocks and the M second data blocks have an association relationship with M data blocks other than the any N data blocks in the N first data blocks and the M second data blocks; and respectively storing data blocks corresponding to the original data into different disks of the single-node server.

18 Claims, 12 Drawing Sheets

(58) Field of Classification Search
USPC .......................................................... 713/6.3
See application file for complete search history.

(56) References Cited

U.S. PATENT DOCUMENTS

| | | | | |
|---|---|---|---|---|
| 2017/0077950 | A1* | 3/2017 | Pavlov | G06F 3/0647 |
| 2020/0250036 | A1* | 8/2020 | Zhang | G06F 3/06 |

FOREIGN PATENT DOCUMENTS

| | | | |
|---|---|---|---|
| CN | 109086000 | A | 12/2018 |
| CN | 110389715 | A | 10/2019 |
| CN | 114116321 | A | 3/2022 |
| CN | 115113819 | A | 9/2022 |

* cited by examiner

Overview
Node management
Disaster recovery configuration
State monitoring
System management State monitoring Logout Basic information | IP of node to which it belongs: 112.32.33.50 | Storage parameter: 5+3 | Quantity of disks: 24 | Node state: fault

| No. | No. of disks | Node to which it belongs | Data recovery state | Recovery progress | Operation | |
|---|---|---|---|---|---|---|
| 1 | 1-001 | 112.32.33.50 | Ongoing | 20% | Begin to recover | End recovering |
| 2 | 1-002 | 112.32.33.50 | Ongoing | 35% | Begin to recover | End recovering |
| 3 | 1-003 | 112.32.33.50 | Ongoing | 70% | Begin to recover | End recovering |
| 4 | 1-004 | 112.32.33.50 | Completed | 100% | Begin to recover | End recovering |
| 5 | 1-005 | 112.32.33.50 | Not started | 0% | Begin to recover | End recovering |
| 6 | 1-006 | 112.32.33.50 | Not started | 0% | Begin to recover | End recovering |
| 7 | 1-007 | 112.32.33.50 | No recovery is required | 0% | Begin to recover | End recovering |
| 8 | 1-008 | 112.32.33.50 | No recovery is required | 0% | Begin to recover | End recovering |
| 9 | 2-001 | 112.32.33.50 | No recovery is required | 0% | Begin to recover | End recovering |
| 10 | 2-002 | 112.32.33.50 | No recovery is required | 0% | Begin to recover | End recovering |
| 11 | 2-003 | 112.32.33.50 | No recovery is required | 0% | Begin to recover | End recovering |
| 12 | 2-004 | 112.32.33.50 | No recovery is required | 0% | Begin to recover | End recovering |

FIG. 14

DATA STORAGE METHOD, SINGLE-NODE SERVER, AND DEVICE

CROSS-REFERENCE TO RELATED APPLICATIONS

The present disclosure is a National Stage of International Application No. PCT/CN2023/091389, filed on Apr. 27, 2023, which claims priority to the Chinese patent application No. 202210762767.2 filed on Jun. 29, 2022 to the China National Intellectual Property Administration, and entitled "DATA STORAGE METHOD, SINGLE-NODE SERVER, AND DEVICE", the entire content of which is incorporated herein by reference.

TECHNICAL FIELD

The present disclosure relates to the technical field of data storage and disaster tolerance, in particular to a data storage method, a single-node server, and a device.

BACKGROUND

Faced with various possible disasters, enterprises need to conveniently and flexibly synchronize data residing in different databases in heterogeneous environments. Therefore, it is necessary to build a local and remote disaster tolerance system that can withstand or resolve various situations.

In the application environment of audio and video data storage of traditional single-node servers, it is usually necessary to rely on professional redundant array of independent disk (RAID) hardware resources to provide a multi-level disaster recovery capability, such as using RAID5 or RAID6. However, traditional hard RAID solutions require sacrificing hardware resources to provide a highly-available disaster recovery capability, and the needs of reducing hardware resource costs and improving disaster recovery capabilities are difficult to meet at the same time.

SUMMARY

In a first aspect, an embodiment of the present disclosure provides a data storage method, including:

obtaining storage parameters of at least one single-node server, the storage parameters represent parameters used when slicing processing and encoding processing are performed on original data to be stored;

according to the storage parameters of the single-node server, determining N first data blocks and M second data blocks which are obtained after the original data to be stored are processed, any N data blocks in the N first data blocks and the M second data blocks have an association relationship with M data blocks other than the any N data blocks in the N first data blocks and the M second data blocks, N and M are both positive integers, and M is less than or equal to N; and respectively storing data blocks corresponding to the original data into different disks of the single-node server, the data blocks corresponding to the original data include N first data blocks and M second data blocks.

As an optional implementation, after the respectively storing data blocks corresponding to the original data into different disks of the single-node server, the method further includes:

determining index information of the data blocks corresponding to the original data; and generating index files according to the index information, and storing the index files into the disks.

As an optional implementation, the determining index information of the data blocks corresponding to the original data includes:

determining the index information of the data blocks according to first identification information related to the original data, second identification information related to the second data blocks and disk information stored in the data blocks.

As an optional implementation, when it is determined that a maximum of M data blocks are lost, the method further includes:

retrieving at least N data blocks having an association relationship with the lost data blocks;

performing a data recovery operation on the lost data blocks to obtain a maximum of M recovered data blocks by using the at least N data blocks having the association relationship with the lost data blocks; and storing the maximum of M recovered data blocks in available disks of the single-node server, different recovered data blocks are stored in different disks.

As an optional implementation, the retrieving at least N data blocks having an association relationship with the lost data blocks includes:

determining target index information associated with index information of the lost data blocks according to the index information in the index files stored in the disks; and retrieving the at least N data blocks having the association relationship with the lost data blocks from the corresponding disks according to disk information in the target index information.

As an optional implementation, after the storing the maximum of M recovered data blocks in available disks of the single-node server, the method further includes:

updating index information of the recovered data blocks before the data recovery operation in the index files according to disk information stored in each recovered data block.

As an optional implementation, the method further includes:

displaying a management interface containing at least one single-node server; and receiving an edition operation executed on configuration parameters of the single-node server by a user through the management interface, and performing at least one operation of adding, modifying, deleting or querying on the configuration parameters corresponding to the edition operation.

As an optional implementation, the storage parameters include first parameters and second parameters, and the obtaining storage parameters of at least one single-node server includes:

receiving the second parameters of the at least one single-node server input by the user through the management interface, the second parameters are determined according to business requirements; and determining the first parameters according to the quantity of available disks and a disk adding cost of the single-node server.

As an optional implementation, the configuration parameters include at least one of a name, an IP address, a node state, a data state, the quantity of disks, storage parameters, the total amount of available storage space, or a storage space utilization rate of the single-node server.

As an optional implementation, when the single-node server loses data blocks, a data recovery situation of the lost data blocks is viewed through a state monitoring interface; or when the single-node server has a disk failure and loses data blocks, a data recovery situation of the lost data blocks is viewed through the state monitoring interface.

As an optional implementation, the storage parameters include first parameters and second parameters, and the according to the storage parameters of the single-node server, determining N first data blocks and M second data blocks which are obtained after the original data to be stored are processed includes:

obtaining the N first data blocks by performing slicing processing on the original data according to the first parameters; and obtaining the M second data blocks by performing encoding processing on the N first data blocks according to the second parameters.

As an optional implementation, the obtaining the M second data blocks by performing encoding processing on the N first data blocks according to the second parameters includes:

obtaining the M second data blocks by performing erasure code processing on the N first data blocks according to the second parameters; wherein the erasure code includes at least one of array erasure codes, RS erasure codes or LDPC erasure codes.

As an optional implementation,

M and N have a following relationship: $M \leq (N+1)/2$; and/or, a ratio of a sum of M and N to the quantity of disks of the single-node server is an integer.

As an optional implementation, the respectively storing data blocks corresponding to the original data into different disks of the single-node server includes:

respectively storing the data blocks corresponding to the original data into the different disks according to a load balance principle and available storage space of the different disks in the single-node server.

In a second aspect, a single-node server provided by an embodiment of the present disclosure includes a processor and a memory, the memory is configured to store a program executable by the processor, and the processor is configured to read the program in the memory and execute the following steps:

obtaining storage parameters of at least one single-node server, the storage parameters represent parameters used when slicing processing and encoding processing are performed on original data to be stored;

according to the storage parameters of the single-node server, determining N first data blocks and M second data blocks which are obtained after the original data to be stored are processed, any N data blocks in the N first data blocks and the M second data blocks have an association relationship with M data blocks other than the any N data blocks in the N first data blocks and the M second data blocks, N and M are both positive integers, and M is less than or equal to N; and respectively storing data blocks corresponding to the original data into different disks of the single-node server, the data blocks corresponding to the original data include N first data blocks and M second data blocks.

As an optional implementation, after the respectively storing data blocks corresponding to the original data into different disks of the single-node server, the processor is further specifically configured to execute:

determining index information of the data blocks corresponding to the original data; and generating index files according to the index information, and storing the index files into the disks.

As an optional implementation, the processor is specifically configured to execute:

determining the index information of the data blocks according to first identification information related to the original data, second identification information related to the second data blocks and disk information stored in the data blocks.

As an optional implementation, when it is determined that a maximum of M data blocks are lost, the processor is further specifically configured to execute:

retrieving at least N data blocks having an association relationship with the lost data blocks;

performing a data recovery operation on the lost data blocks to obtain a maximum of M recovered data blocks by using the at least N data blocks having the association relationship with the lost data blocks; and storing the maximum of M recovered data blocks in available disks of the single-node server, different recovered data blocks are stored in different disks.

As an optional implementation, the processor is specifically configured to execute:

determining target index information associated with index information of the lost data blocks according to the index information in the index files stored in the disks; and retrieving the at least N data blocks having the association relationship with the lost data blocks from the corresponding disks according to disk information in the target index information.

As an optional implementation, after the storing the maximum of M recovered data blocks in available disks of the single-node server, the processor is further specifically configured to execute:

updating index information of the recovered data blocks before the data recovery operation in the index files according to disk information stored in each recovered data block.

As an optional implementation, the processor is further specifically configured to execute:

displaying a management interface containing at least one single-node server; and receiving an edition operation executed on configuration parameters of the single-node server by a user through the management interface, and performing at least one operation of adding, modifying, deleting or querying on the configuration parameters corresponding to the edition operation.

As an optional implementation, the storage parameters include first parameters and second parameters, and the processor is specifically configured to execute:

receiving the second parameters of the at least one single-node server input by the user through the management interface, the second parameters are determined according to business requirements; and determining the first parameters according to the quantity of available disks and a disk adding cost of the single-node server.

As an optional implementation, the configuration parameters include at least one of a total amount of available storage space, or a storage space utilization rate of the single-node server.

As an optional implementation, the processor is specifically configured to execute:

when the single-node server loses data blocks, a data recovery situation of the lost data blocks is viewed through a state monitoring interface; or when the single-node server has a disk failure and loses data blocks, a data recovery situation of the lost data blocks is viewed through the state monitoring interface.

As an optional implementation, the storage parameters include first parameters and second parameters, and the processor is specifically configured to execute:

obtaining the N first data blocks by performing slicing processing on the original data according to the first parameters; and obtaining the M second data blocks by performing encoding processing on the N first data blocks according to the second parameters.

As an optional implementation, the processor is specifically configured to execute:

obtaining the M second data blocks by performing erasure code processing on the N first data blocks according to the second parameters; wherein the erasure code includes at least one of array erasure codes, RS erasure codes or LDPC erasure codes.

As an optional implementation,

M and N have a following relationship: $M \leq (N+1)/2$; and/or, a ratio of a sum of M and N to the quantity of disks of the single-node server is an integer.

As an optional implementation, the processor is specifically configured to execute:

respectively storing the data blocks corresponding to the original data into the different disks according to a load balance principle and available storage space of the different disks in the single-node server.

In a third aspect, an embodiment of the present disclosure further provides a data storage device, the device includes a processor and a memory, the memory is configured to store a program executable by the processor, and the processor is configured to read the program in the memory and execute the following steps:

obtaining storage parameters of at least one single-node server, the storage parameters represent parameters used when slicing processing and encoding processing are performed on original data to be stored;

according to the storage parameters of the single-node server, determining N first data blocks and M second data blocks which are obtained after the original data to be stored are processed, any N data blocks in the N first data blocks and the M second data blocks have an association relationship with M data blocks other than the any N data blocks in the N first data blocks and the M second data blocks, N and M are both positive integers, and M is less than or equal to N; and respectively storing data blocks corresponding to the original data into different disks of the single-node server, the data blocks corresponding to the original data include N first data blocks and M second data blocks.

As an optional implementation, after the respectively storing data blocks corresponding to the original data into different disks of the single-node server, the processor is further specifically configured to execute:

determining index information of the data blocks corresponding to the original data; and generating index files according to the index information, and storing the index files into the disks.

As an optional implementation, the processor is specifically configured to execute:

determining the index information of the data blocks according to first identification information related to the original data, second identification information related to the second data blocks and disk information stored in the data blocks.

As an optional implementation, when it is determined that a maximum of M data blocks are lost, the processor is further specifically configured to execute:

retrieving at least N data blocks having an association relationship with the lost data blocks;

performing a data recovery operation on the lost data blocks to obtain a maximum of M recovered data blocks by using the at least N data blocks having the association relationship with the lost data blocks; and storing the maximum of M recovered data blocks in available disks of the single-node server, different recovered data blocks are stored in different disks.

As an optional implementation, the processor is specifically configured to execute:

determining target index information associated with index information of the lost data blocks according to the index information in the index files stored in the disks; and retrieving the at least N data blocks having the association relationship with the lost data blocks from the corresponding disks according to disk information in the target index information.

As an optional implementation, after the storing the maximum of M recovered data blocks in available disks of the single-node server, the processor is further specifically configured to execute:

updating index information of the recovered data blocks before the data recovery operation in the index files according to disk information stored in each recovered data block.

As an optional implementation, the processor is further specifically configured to execute:

displaying a management interface containing at least one single-node server; and receiving an edition operation executed on configuration parameters of the single-node server by a user through the management interface, and performing at least one operation of adding, modifying, deleting or querying on the configuration parameters corresponding to the edition operation.

As an optional implementation, the storage parameters include first parameters and second parameters, and the processor is specifically configured to execute:

receiving the second parameters of the at least one single-node server input by the user through the management interface, the second parameters are determined according to business requirements; and determining the first parameters according to the quantity of available disks and a disk adding cost of the single-node server.

As an optional implementation, the configuration parameters include at least one of a total amount of available storage space, or a storage space utilization rate of the single-node server.

As an optional implementation, the processor is specifically configured to execute:

when the single-node server loses data blocks, a data recovery situation of the lost data blocks is viewed through a state monitoring interface; or when the single-node server has a disk failure and loses data blocks, a data recovery situation of the lost data blocks is viewed through the state monitoring interface.

As an optional implementation, the storage parameters include first parameters and second parameters, and the processor is specifically configured to execute:

obtaining the N first data blocks by performing slicing processing on the original data according to the first parameters; and obtaining the M second data blocks by performing encoding processing on the N first data blocks according to the second parameters.

As an optional implementation, the processor is specifically configured to execute:

obtaining the M second data blocks by performing erasure code processing on the N first data blocks according to the second parameters; wherein the erasure code includes at least one of array erasure codes, RS erasure codes or LDPC erasure codes.

As an optional implementation,

M and N have a following relationship: $M \leq (N+1)/2$; and/or, a ratio of a sum of M and N to the quantity of disks of the single-node server is an integer.

As an optional implementation, the processor is specifically configured to execute:

respectively storing the data blocks corresponding to the original data into the different disks according to a load balance principle and available storage space of the different disks in the single-node server.

In a fourth aspect, an embodiment of the present disclosure further provides a data storage apparatus, including:

a parameter obtaining module, configured to obtain storage parameters of at least one single-node server, the storage parameters represent parameters used when slicing processing and encoding processing are performed on original data to be stored;

a slicing and encoding module, configured to, according to the storage parameters of the single-node server, determine N first data blocks and M second data blocks which are obtained after the original data to be stored are processed, any N data blocks in the N first data blocks and the M second data blocks have an association relationship with M data blocks other than the any N data blocks in the N first data blocks and the M second data blocks, N and M are both positive integers, and M is less than or equal to N; and a data storage module, configured to respectively store data blocks corresponding to the original data into different disks of the single-node server, the data blocks corresponding to the original data include N first data blocks and M second data blocks.

As an optional implementation, after the respectively storing data blocks corresponding to the original data into different disks of the single-node server, the data storage module is further configured to:

determine index information of the data blocks corresponding to the original data; and generate index files according to the index information, and store the index files into the disks.

As an optional implementation, the data storage module is specifically configured to:

determine the index information of the data blocks according to first identification information related to the original data, second identification information related to the second data blocks and disk information stored in the data blocks.

As an optional implementation, when it is determined that a maximum of M data blocks are lost, the data storage module is further configured to:

retrieve at least N data blocks having an association relationship with the lost data blocks;

perform a data recovery operation on the lost data blocks to obtain a maximum of M recovered data blocks by using the at least N data blocks having the association relationship with the lost data blocks; and store the maximum of M recovered data blocks in available disks of the single-node server, different recovered data blocks are stored in different disks.

As an optional implementation, the data storage module is specifically configured to:

determine target index information associated with index information of the lost data blocks according to the index information in the index files stored in the disks; and retrieve the at least N data blocks having the association relationship with the lost data blocks from the corresponding disks according to disk information in the target index information.

As an optional implementation, after the storing the maximum of M recovered data blocks in available disks of the single-node server, the data storage module is further specifically configured to:

update index information of the recovered data blocks before the data recovery operation in the index files according to disk information stored in each recovered data block.

As an optional implementation, an interaction unit is further included, which is specifically configured to:

display a management interface containing at least one single-node server; and receive an edition operation executed on configuration parameters of the single-node server by a user through the management interface, and perform at least one operation of adding, modifying, deleting or querying on the configuration parameters corresponding to the edition operation.

As an optional implementation, the storage parameters include first parameters and second parameters, and the interaction unit is specifically configured to:

receive the second parameters of the at least one single-node server input by the user through the management interface, the second parameters are determined according to business requirements; and determine the first parameters according to the quantity of available disks and a disk adding cost of the single-node server.

As an optional implementation, the configuration parameters include at least one of a total amount of available storage space, or a storage space utilization rate of the single-node server.

As an optional implementation, the interaction unit is specifically configured to:

when the single-node server loses data blocks, view a data recovery situation of the lost data blocks through a state monitoring interface; or when the single-node server has a disk failure and loses data blocks, view a data recovery situation of the lost data blocks through the state monitoring interface.

As an optional implementation, the storage parameters include first parameters and second parameters, and the slicing and encoding module is specifically configured to:

obtain the N first data blocks by performing slicing processing on the original data according to the first parameters; and obtain the M second data blocks by performing encoding processing on the N first data blocks according to the second parameters.

As an optional implementation, the slicing and encoding module is specifically configured to:

obtain the M second data blocks by performing erasure code processing on the N first data blocks according to the second parameters; wherein the erasure code includes at least one of array erasure codes, RS erasure codes or LDPC erasure codes.

As an optional implementation,

M and N have a following relationship: $M \leq (N+1)/2$; and/or, a ratio of a sum of M and N to the quantity of disks of the single-node server is an integer.

As an optional implementation, the data storage module is specifically configured to:

respectively store the data blocks corresponding to the original data into the different disks according to a load balance principle and available storage space of the different disks in the single-node server.

In a fifth aspect, an embodiment of the present disclosure further provides a computer storage medium, storing a computer program thereon, the program, when executed by a processor, is used for implementing steps of the method in the first aspect above.

BRIEF DESCRIPTION OF FIGURES

In order to explain technical solutions in embodiments of the present disclosure more clearly, the following will briefly introduce the accompanying drawings that need to be used in the description of the embodiments. Apparently, the accompanying drawings in the following description are only some embodiments of the present disclosure, and for those of ordinary skill in the art, on the premise of no creative labor, other accompanying drawings can be obtained from these accompanying drawings.

FIG. 14 illustrates a state monitoring interface provided by an embodiment of the present disclosure.

DETAILED DESCRIPTION

Figure 1:
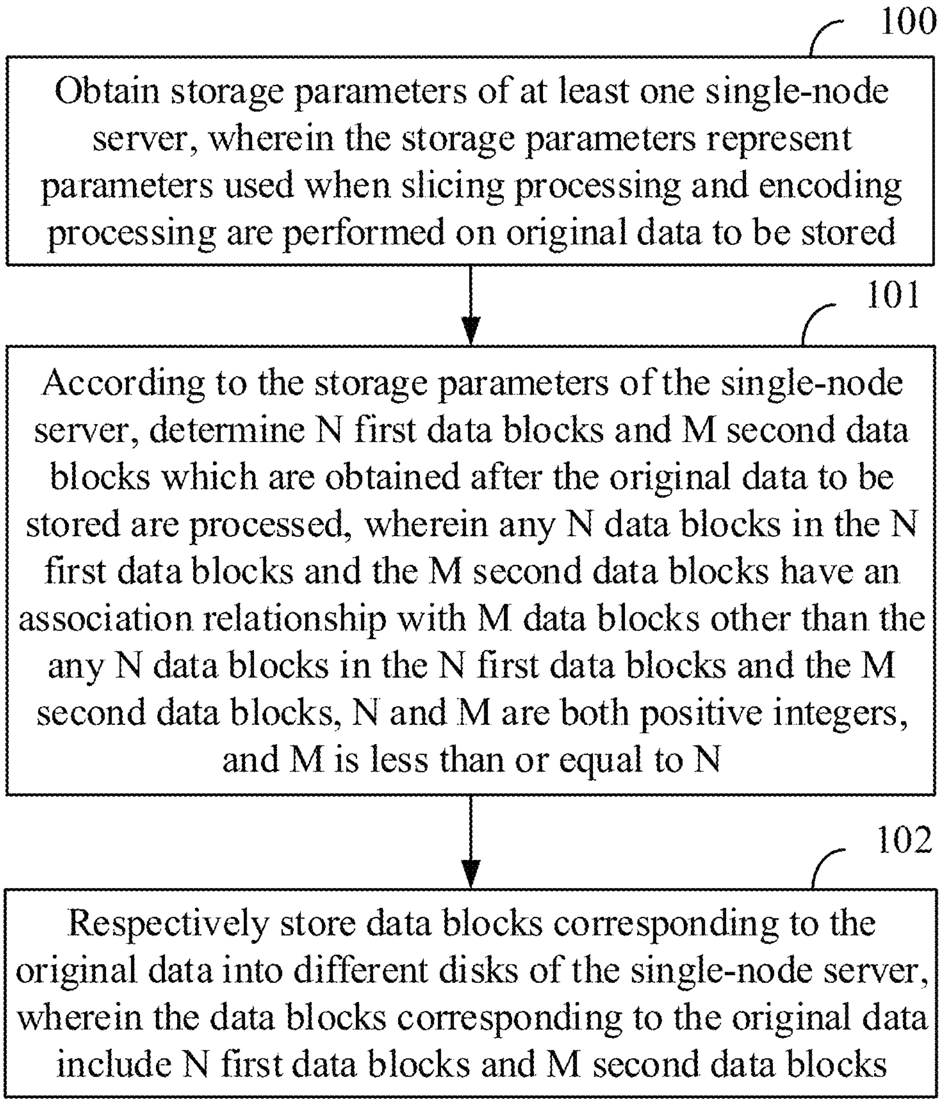
FIG. 1 is a specific implementation flow diagram of a data storage method provided by an embodiment of the present disclosure.

In order to make the objects, technical solutions and advantages of the present disclosure clearer, the present disclosure will be further described in detail in combination with the accompanying drawings below. Apparently, the described embodiments are only part of the embodiments of the present disclosure, not all of them. Based on the embodiments of the present disclosure, all other embodiments obtained by those of ordinary skill in the art without creative work shall fall within the protection scope of the present disclosure.

In the embodiments of the present disclosure, the term "disaster recovery" generally represents disaster redundancy, which refers to establishing a systematic data emergency manner in advance by utilizing scientific technical means and methods so as to deal with the occurrence of disasters. Its content includes data backup and system backup, business continuity planning, personnel architectures, communication support, crisis public relations, disaster recovery planning, disaster recovery plans, business recovery plans, emergency response, third-party cooperation organizations, supply chain crisis management, etc.

In the embodiments of the present disclosure, the term "redundant array of independent disk (RAID)" is an old disk redundant backup technology, which specifically refers to combining N hard disks into a single virtual large-capacity hard disk for use by means of an RAID Controller, the RAID includes RAID0-9, RAID10 and the like according to different realizing technologies. At present, RAID5 and RAID6 are more applied to the field of audio and video storage.

In the embodiments of the present disclosure, the term "erasure code, abbreviated as EC" is a coding fault tolerance technology, in which m data may be added according to n original data, and original data may be restored through any n data in n+m data. That is, if any data less than or equal to m data become invalid, the data can still be restored through the remaining data.

In the embodiments of the present disclosure, the term "and/or" describes the association relationship of associated objects, which represents that there can be three kinds of relationships, for example, A and/or B can represent that there are three kinds of situations: A alone, A and B at the same time, and B alone. The character "/" universally indicates that front and back associated objects are in an "or" relationship.

Application scenarios described in the embodiments of the present disclosure are to more clearly illustrate the technical solutions of the embodiments of the present disclosure, and do not constitute a limitation on the technical solutions provided by the embodiments of the present disclosure. It is known to those ordinarily skilled in the art that with the appearance of new application scenarios, the technical solutions provided by the embodiments of the present disclosure are also suitable for similar technical problems. In the description of the present disclosure, unless otherwise stated, "plurality of" means two or more.

Embodiment 1. Faced with various possible disasters, enterprises need to conveniently and flexibly synchronize data residing in different databases in heterogeneous environments. Therefore, it is necessary to build a local and remote disaster tolerance system that can withstand or resolve various situations. In the application environment of audio and video data storage of traditional single-node servers, it is usually necessary to rely on professional RAID hardware resources to provide a multi-level disaster recovery capability, such as using RAID5 or RAID6. However, traditional hard RAID solutions require sacrificing hardware resources to provide a highly-available disaster recovery capability, and the needs of reducing hardware resource costs and improving disaster recovery capabilities are difficult to meet at the same time. At present, in a single-node audio and video data storage solution, an RAID is used for storing disaster recovery data, when a disaster comes, if the stored data are lost or damaged, original data may be recovered through the disaster recovery data stored in the RAID, and then the original data are stored in original storage space again, the disaster recovery data are obtained by processing the original data through a preset algorithm and/or operation.

A traditional hard RAID solution is effective and reliable when protecting single-node disk data, meanwhile, an RAID algorithm is realized in a manner that a special-purpose computer chip supports hardware, which may improve the efficiency and reduce resource occupancy, but the hardware cost is relatively high. When an RAID algorithm supporting redundancy is used alone, a damaged single disk may be recovered by the RAID algorithm, but recovery time for an 8T+ disk may be up to several days, and meanwhile, the RAID algorithm is poor in flexibility at the cloud era.

An audio and video data storage solution provided by the present embodiment does not rely on the traditional RAID solution, a multi-level disaster recovery storage solution is realized in a software form, disaster recovery storage is realized by using improvement on a storage manner, different levels of disaster recovery requirements can be provided as long as different values of M are set, the hardware resource cost is saved, and meanwhile, the disaster recovery capability may further be improved.

It should be noted that, data in the present embodiment include but are not limited to audio and video data.

A data storage method provided by the present embodiment is applied to a single-node server, a storage solution for audio and video data may be realized, slicing processing and encoding processing are performed on original data by using storage parameters, N first data blocks and M second data blocks are obtained after the original data are processed, according to an association relationship between any N data blocks and remaining M data blocks obtained after the original data are processed, when a maximum of M data blocks are lost, recovery is performed by using N data blocks corresponding to remaining original data so as to recover the lost data blocks, and additionally, by respectively storing data blocks corresponding to the original data into different disks of the single-node server, the storage pressure of a single disk is reduced, and the storage space utilization rate is improved. As M in the present embodiment is settable, different levels of disaster recovery requirements may further be provided by setting different M, and compared to the traditional RAID solution, the multiple levels of disaster recovery requirements can be provided more flexibly without relying on hardware resources.

As shown in FIG. 1, a specific implementation flow of a data storage method provided by an embodiment of the present disclosure is as follows.

Step 100, storage parameters of at least one single-node server are obtained, the storage parameters represent parameters used when slicing processing and encoding processing are performed on original data to be stored.

It should be noted that, the present embodiment may provide storage requirements for one or more single-node servers, a storage strategy of each single-node server is determined according to corresponding storage parameters, and the present embodiment may provide different disaster recovery level requirements for each single-node server and realize storage requirements of different disaster recovery levels by setting the storage parameters. In the present embodiment, the storage parameters correspond to the single-node servers, the storage parameters of each single-node server may be set at a WEB end by a user, and the set storage parameters are sent to the corresponding single-node servers such that the single-node servers realize disaster recovery requirements by utilizing the storage parameters.

In some embodiments, the original data in the present embodiment include but are not limited to original audio and video stream data.

In some embodiments, the storage parameters in the present embodiment include but are not limited to first parameters and second parameters, and optionally, the first parameters and the second parameters are both obtained via calculation by the single-node server itself; or, the first parameters are calculated by the single-node server, and the second parameters are input by the user; or, the first parameters and the second parameters are both input by the user.

In some embodiments, the first parameters are determined according to the quantity of available disks and a disk adding cost of the single-node server, and the second parameters are determined according to business requirements.

In some embodiments, the single-node server may calculate the second parameters according to business requirements corresponding to the data to be stored, and may further recommend the second parameters to the user for selection, and the user may select the second parameters recommended by the single-node server or re-input new second parameters; and similarly, the single-node server may further calculate the first parameters according to the quantity of the available disks and the disk adding cost of the single-node server, and recommend the first parameters to the user for selection, and the user may select the first parameters recommended by the single-node server or re-input new first parameters.

In some embodiments, the single-node server may receive second parameters input by the user via a management interface displayed at the WEB end, and then calculate the first parameters according to the quantity of the available disks and the disk adding cost of the single-node server. Optionally, the first parameters represent total space of disks and available space of the disks of servers provided in a project, and may be determined in advance. The second parameters represent actual demands of users in the project, for example, the second parameters are determined according to a disaster recovery level desired by a user, the value of M in the present embodiment will be obtained after the second parameters are determined, after the value of M is determined, a value range of the first parameters N will be inferred according to a calculation formula, and then the value of the first parameters N in the present embodiment is finally determined according to a user-acceptable additional storage space cost caused by disaster recovery.

In some embodiments, the first parameters represent parameters used when slicing processing is performed on the original data to be stored, and the second parameters represent parameters used when encoding processing is performed on the original data to be stored. Optionally, the second parameters are less than or equal to the first parameters. Optionally, the first parameters are N, the second parameters are M, N and M are both positive integers, and M is less than or equal to N.

In some embodiments, the first parameters and the second parameters have the following relationship:

second parameters≤(first parameters+1)/2; and/or, a ratio of a sum of the first parameters and the second parameters to the quantity of disks of the single-node server is an integer. During implementation, the first parameters are used for representing the quantity of first data blocks after slicing processing on the original data, and the second parameters are used for representing the quantity of added second data blocks after the first data blocks are encoded. Optionally, the sum of the second parameters and the first parameters may be exactly divided by the quantity of the disks (i.e., the total quantity of available disks) of the single-node server. In this way, it can be guaranteed that data blocks are distributed in every disk in the single-node server, thereby guaranteeing the load balance of each disk.

In some embodiments, M and N have the following relationship:

$M \leq (N+1)/2$; and/or, a ratio of a sum of M and N to the quantity of the disks of the single-node server is an integer.

Step 101, according to the storage parameters of the single-node server, N first data blocks and M second data blocks which are obtained after the original data to be stored are processed are determined, any N data blocks in the N first data blocks and the M second data blocks have an association relationship with M data blocks other than the any N data blocks in the N first data blocks and the M second data blocks, N and M are both positive integers, and M is less than or equal to N.

In some embodiments, the storage parameters include first parameters and second parameters, and slicing processing and encoding processing are performed on the original data through the following steps.

(1) The N first data blocks are obtained by performing slicing processing on the original data according to the first parameters.

During implementation, the first parameters may be N, and the original data are sliced into N parts to obtain N first data blocks, slicing processing specifically refers to slicing the original data in a certain sequence. Since a video stream of a camera is streaming itself, but general cloud storage is object storage instead of a stream-oriented file without beginning and ending, the streaming video stream has to be divided into individual files. Therefore, a streaming file generally needs to be sliced and stored in particular container formats after being sliced, such as MP4 and TS. The data blocks obtained after slicing may be the same or different in size, which is not limited too much in the present embodiment. The slicing sequence for the original data in the present embodiment is determined based on an erasure principle, which is not limited too much here.

(2) The M second data blocks are obtained by performing encoding processing on the N first data blocks according to the second parameters.

During implementation, the second parameters may be M, and the M second data blocks different from the first data blocks are obtained after performing encoding processing on the N first data blocks.

In some embodiments, the original data may be processed through erasure code, and the M second data blocks are obtained by performing erasure code processing on the N first data blocks according to the second parameters. Optionally, the erasure code in the present embodiment includes but is not limited to at least one of array erasure codes, RS erasure codes or LDPC erasure codes.

Step 102, data blocks corresponding to the original data are stored into different disks of the single-node server respectively, the data blocks corresponding to the original data include N first data blocks and M second data blocks.

In some embodiments, the data blocks corresponding to the original data may be stored into the different disks respectively according to a load balance principle and available storage space of the different disks in the single-node server. During implementation, if the different disks in the single-node server are different in available storage space, different data blocks may be allocated to and stored in the different disks by using the load balance principle, for example, more data blocks are allocated to and stored in disks with larger storage space, and fewer data blocks are allocated to and stored in disks with smaller storage space, thereby guaranteeing the load balance of the disks of the single-node server. If the different disks in the single-node server are the same in available storage space, the data blocks corresponding to the original data may be allocated to the disks averagely to guarantee the load balance of the disks.

It should be noted that, the present embodiment may slice and encode the original data by using the erasure code technology and then store the original data into the different disks of the single-node server, and thus, when a disaster comes, lost data blocks may be recovered by using the association relationship between the any N data blocks and the remaining M data blocks in erasure code. The original data in erasure code correspond to N+M data blocks.

Figure 2:
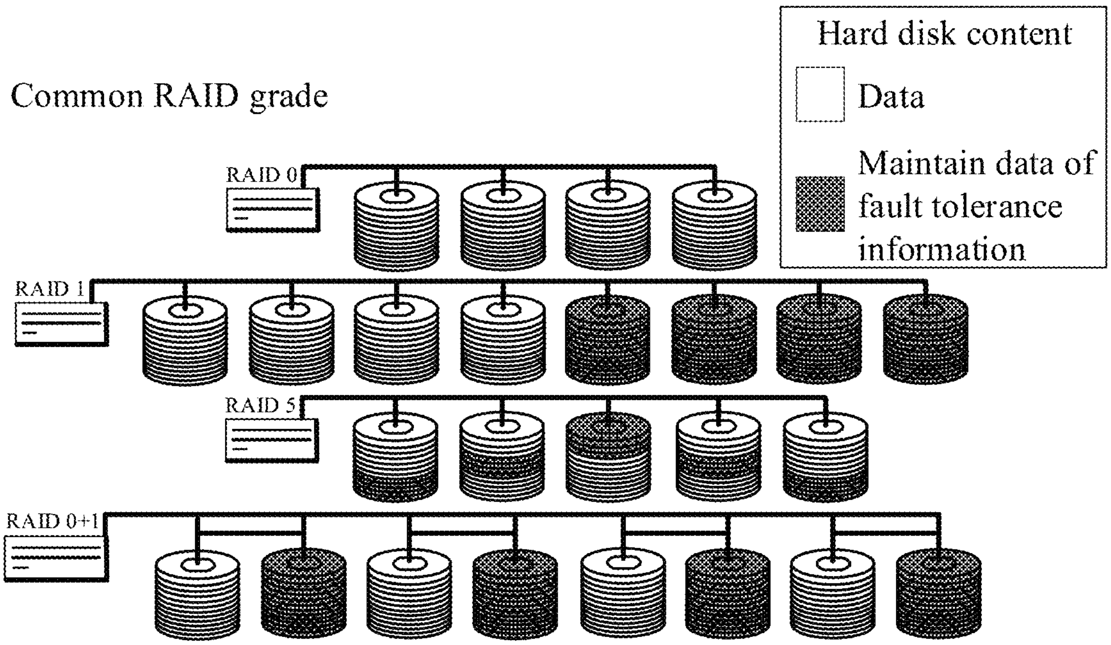
FIG. 2 is a schematic diagram of a hard disk of a common RAID grade provided by an embodiment of the present disclosure.

At present, the erasure code technology applied to the field of audio and video data storage is realized relying on more than three server codes, and there is no data storage scenario applied to the single-node server. Erasure code (abbreviated as EC) is a coding fault tolerance technology, in which m data may be added to n original data, and any n data in n+m data can be restored to the original data. Based on this principle, the M second data blocks obtained by performing encoding processing on the N first data blocks may be added to the N first data blocks obtained after the original data are sliced, and then the original data are restored according to any N data blocks in N+M data. That is, if any data less than or equal to m data become invalid, the data can still be restored through the remaining data. EC is mainly applied to the fields of storage and digital coding, such as disk array storage (RAID5, RAID6) and cloud storage (RS). RAID is a special case of EC. As shown in FIG. 2, the present embodiment provides a schematic diagram of a hard disk of a common RAID grade. In traditional RAIDs, failure of only limited disks is supported, RAID5 only supports failure of one disk, RAID6 supports failure of two disks, while EC supports failure of a plurality of disks.

In some embodiments, the application of the erasure code technology in the present embodiment to a distributed storage system includes but is not limited to any one or more of the following: array erasure codes (such as RAID5 and RAID6), Reed-Solomon (RS), and low density parity check codes (LDPCs).

An encoding principle of erasure code in the present embodiment is illustrated below by taking the RS erasure codes as an example.

RS erasure codes are an encoding algorithm based on finite fields, the finite fields are also referred to as Galois Field, and GF (2^w) is used in the RS erasure codes, where 2^w≥n+m.

RS code encoding refers to that: n data blocks D1, D2 . . . . Dn and one positive integer m are given, and m code blocks, C1, C2 . . . . Cm, are generated by RS according to the n data blocks. RS code decoding refers to that: as for any n and m, original data can be obtained by decoding any n blocks selected from the n original data blocks and the m code blocks, that is, simultaneous loss of a maximum of m data blocks or code blocks can be tolerated in RS.

RS encoding and decoding involve matrix inversion, a Gaussian elimination method is adopted, four arithmetic operations of addition, subtraction, multiplication, and division of real numbers are required, and it cannot act on binary data with a word length of w. In order to solve this problem, RS adopts the law of four arithmetic operations defined in the Galois group GF (2^w). A GF (2^w) field has 2^w values, each value corresponding to one polynomial of degrees less than w, so the four arithmetic operations on the field are transformed into operations in polynomial space. Addition in the GF (2^w) field is XOR, multiplication is realized by table look-up, and two tables with sizes of 2^w−1 need to be maintained, which are: a log table gflog, and an anti-log table gfilog respectively.

A multiplication formula in the GF field is a×b=gfilog (gflog(a)+fglog(b)) % (2^w−1), where gfilog, gflog and fglog all denote operational symbols in the GF field, gflog denotes encoding operation, and fglog denotes decoding operation.

(1) RS Code Encoding Principle.

RS encoding takes a word as an encoding and decoding unit, a large data block is split into words with a word length of w (values are generally 8 bits or 16 bits), and then the words are encoded and decoded. An encoding principle of data blocks is the same as an encoding principle of words, illustration is made by taking a word as an example, and variables Di and Ci represent one word.

Input data are regarded as a vector D=(D1, D2, . . . , Dn), and encoded data are regarded as a vector (D1, D2, . . . , Dn, C1, C2, . . . , Cm).

Figure 3:
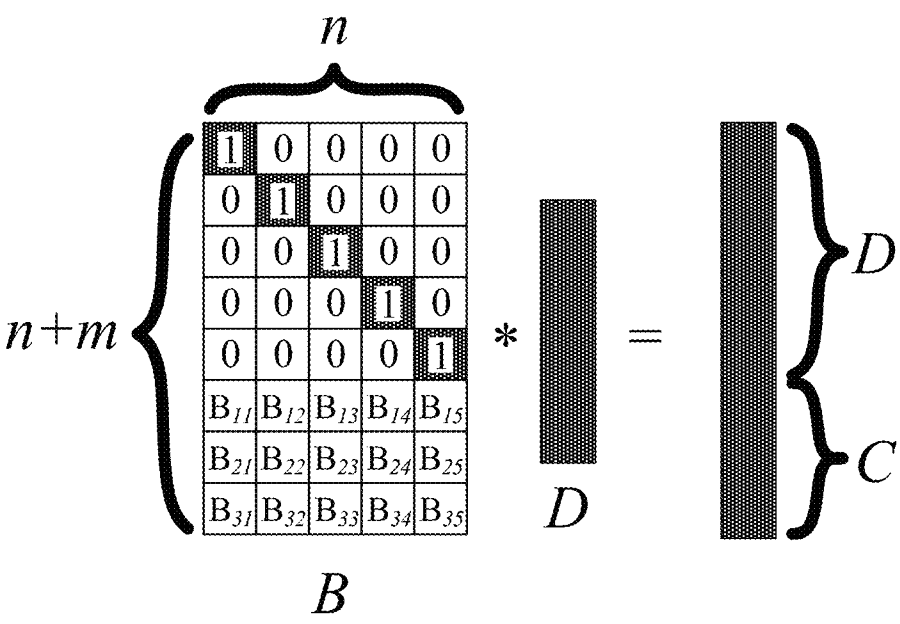
FIG. 3 is a schematic diagram of matrix operation for RS erasure codes provided by an embodiment of the present disclosure.

As shown in FIG. 3, the present embodiment provides a schematic diagram of matrix operation for RS erasure codes. Taking n=5 and m=3 as an example, that is, 5 original data blocks D are multiplied by a matrix B of (n+m)×n to obtain a matrix of (n+m)×1. According to the characteristics of the matrix, it can be known that first 5 values in the matrix of (n+m)×1 are the same as values of the 5 original data blocks D, while the last 3 values are calculated check blocks C. The matrix B in FIG. 3 is an encoding matrix (or referred to as a generator matrix or a distribution matrix), and the encoding matrix needs to satisfy invertibility of any n×n submatrix. In the matrix, D is the original data blocks, and C is the check blocks obtained by encoding. For the convenience of data storage, an upper part of the encoding matrix is a unit matrix (n rows and n columns), and a lower part of the encoding matrix is an m-row n-column matrix. The lower matrix may be a Vandermonde matrix or a Cauchy matrix.

(2) RS Code Encoding Data Recovery Principle.

RS can tolerate deletion of a maximum of m data blocks. A data recovery process is as follows.

Figure 4:
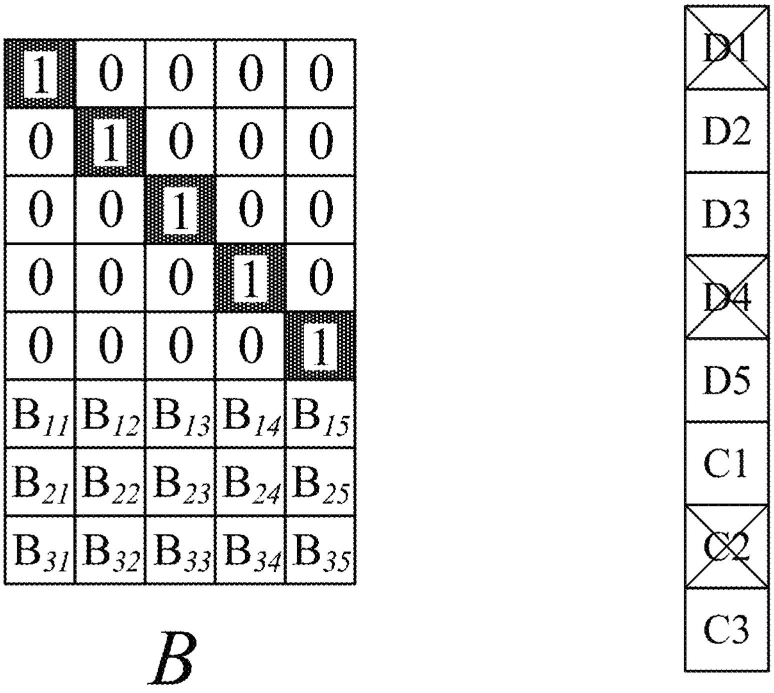
FIG. 4 is a schematic diagram of a data recovery process at the first stage provided by an embodiment of the present disclosure.

As shown in FIG. 4, a schematic diagram of a data recovery process at a first stage provided by the present embodiment, it is assumed that data blocks D1, D4 and C2 are lost, and rows corresponding to the lost data blocks/code blocks are deleted from the encoding matrix.

Figure 5:
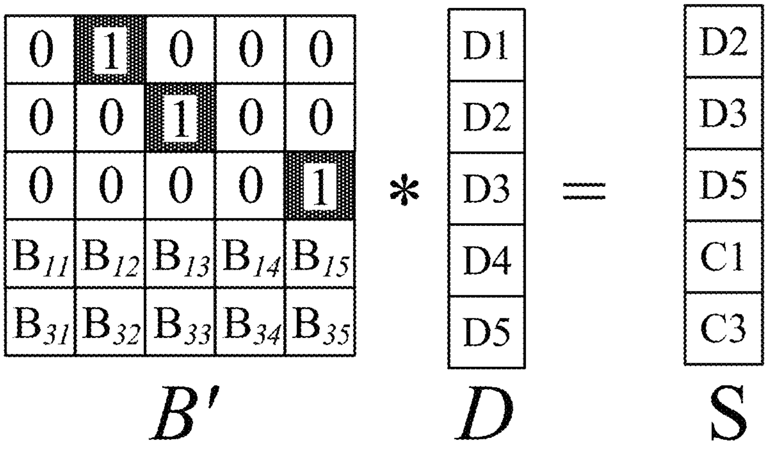
FIG. 5 is a schematic diagram of a data recovery process at the second stage provided by an embodiment of the present disclosure.

As shown in FIG. 5, a schematic diagram of a data recovery process at a second stage provided by the present embodiment, a matrix B' and a first process equation may be obtained according to the RS encoding operation equation shown in FIG. 3.

Figure 6:
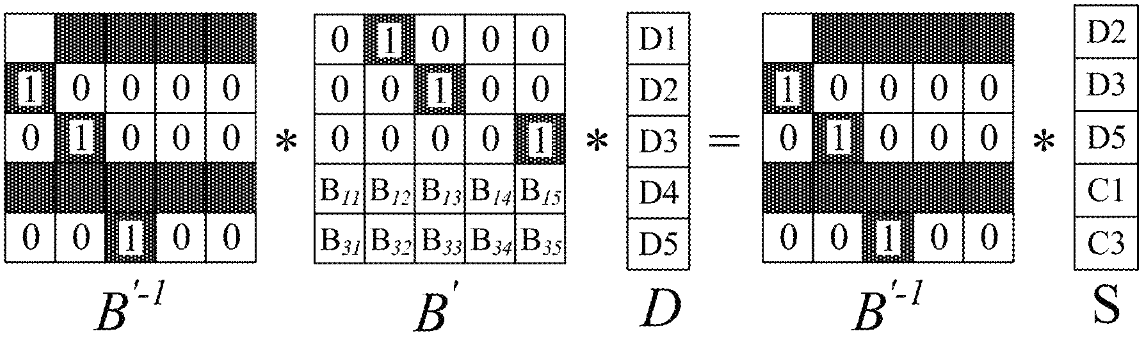
FIG. 6 is a schematic diagram of a data recovery process at the third stage provided by an embodiment of the present disclosure.

As shown in FIG. 6, a schematic diagram of a data recovery process at a third stage provided by the present embodiment, since the matrix B' is invertible, an inverse matrix of B' is (B'^−1), and then B'×(B'^−1)=I(unit matrix). The two sides of the first process equation are premultiplied by the inverse matrix of B'.

Figure 7:
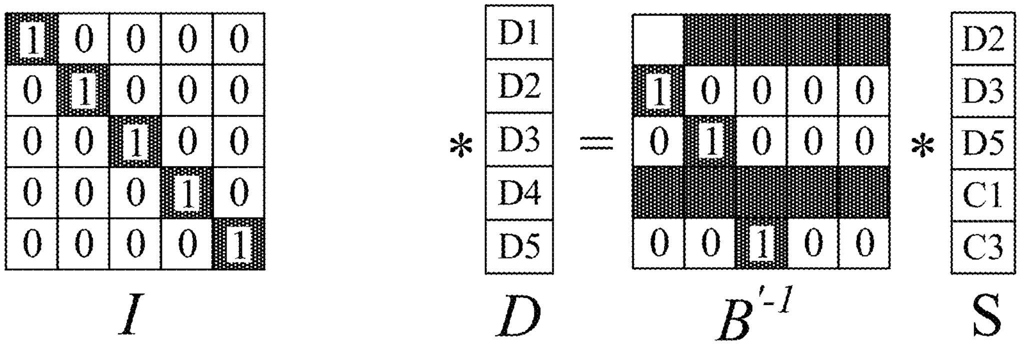
FIG. 7 is a schematic diagram of a data recovery process at the fourth stage provided by an embodiment of the present disclosure.

As shown in FIG. 7, a schematic diagram of a data recovery process at a fourth stage provided by the present embodiment, the equation in FIG. 6 is simplified to obtain a calculation formula about original data D.

Figure 8:
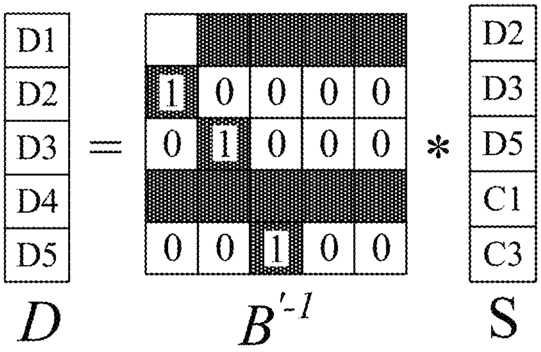
FIG. 8 is a schematic diagram of a data recovery process at the fifth stage provided by an embodiment of the present disclosure.

As shown in FIG. 8, a schematic diagram of a data recovery process at a fifth stage provided by the present embodiment, the original data D are recovered according to the calculation formula in FIG. 7.

In the present embodiment, by adopting the erasure code technology, encoded data blocks (i.e., the second data blocks) are obtained by encoding the original data which are subjected to slicing processing, the first data blocks (obtained after slicing the original data) and the second data blocks are stored together to achieve the purpose of fault tolerance, and the basic idea is obtaining M redundant second data blocks (code blocks) by performing certain encoding calculation on N first data blocks of the original data. As for N+M data blocks, when any M data blocks therein are faulty, previous data can be recovered by utilizing remaining N data blocks through a corresponding reconstructing algorithm. A process of generating the second data blocks is called encoding, and a process of recovering the lost data blocks is called decoding.

The present embodiment stores audio and video file data by adopting a mode of N+M (M<=(N+1)/2) in the single-node server, an RAID-like function in a single node is realized in a software manner, and damage of disks with the quantity less than M is supported without affecting the integrity of the data. N is the quantity of slices of the original data, and M is the quantity of parts of redundant data (encoded data blocks). In the N+M mode, this solution allows faults of a maximum of M disks, in which case data can still be accessed normally.

In some embodiments, after the data blocks corresponding to the original data are stored into the different disks of the single-node server respectively in the present embodiment, the following steps are further executed.

Step 1, index information of the data blocks corresponding to the original data is determined.

In some embodiments, the index information may be determined according to identification information of the data blocks, the identification information of each data block represents the uniqueness of the data block, and the identification information of the data block may be defined according to a set rule or determined according to information carried by the data block itself, which is not limited too much in the present embodiment. The identification information of each data block needs to carry disk information stored in the data block, for obtaining the data block stored on a disk.

In some embodiments, the index information of the data blocks is determined according to first identification information related to the original data, second identification information related to the second data blocks and the disk information stored in the data blocks. During implementation, the index information of each data block includes but is not limited to at least three fields, a first field is used for representing the first identification information related to the original data, a second field is used for representing the second identification information related to the second data blocks, and a third field is used for representing the disk information stored in the data blocks. For example, taking a first data block as an example, the index information of the first data block may be {audio and video 1, non-second data block, disk 1}; and taking a second data block as an example, the index information of the second data block may be {audio and video 2, second data block 1, disk 2}.

As the first field in the index information of each data block in the present embodiment contains the first identification information related to the original data, when data are lost and then recovered, remaining data blocks belonging to the same original data may be retrieved according to the first field in the index information, whether a current data block is an original data block or a code block obtained by encoding can be determined according to the second identification information related to the second data blocks contained in the second field, and stored data blocks of the original data can be read from corresponding disks according to the disk information contained in the third field, thereby performing data recovery by utilizing the remaining data blocks.

The index information in the present embodiment is used for retrieving the data blocks corresponding to the same original data, and the data blocks corresponding to the original data can be retrieved more conveniently by traversing the index information, so as to provide faster support for data recovery.

Step 2, index files are generated according to the index information, and the index files are stored into the disks.

It should be noted that, the index files in the present embodiment contain the index information of the data blocks corresponding to at least one original data, the index files in the present embodiment are used for storing index information of audio and video data having storage requirements in the single-node server, and each data block in each audio and video data corresponds to one piece of index information. Different audio and video data are distinguished through the first identification information related to the original data in the index information.

In the present embodiment, the index files are stored in the disks, the index files are equivalent to catalogue files, occupying small storage space when stored in the disks, and when data are lost, remaining data blocks of the original data associated with the lost data may be retrieved from the index files, thereby recovering the lost data by utilizing the remaining data blocks.

In some embodiments, when it is determined that a maximum of M data blocks are lost in the present embodiment, the following steps are further executed to perform data recovery.

Step a, at least N data blocks having an association relationship with the lost data blocks are retrieved.

During implementation, as the any N data blocks and the remaining M data blocks of the original data in the present embodiment have the association relationship, when M data blocks are lost, the original data may be recovered through the remaining N data blocks of the original data. When less than M data blocks are lost, the original data may be recovered through the remaining N data blocks or all the data blocks.

It should be noted that, the M lost data blocks in the present embodiment may all be the first data blocks or the second data blocks, or include the first data blocks and the second data blocks, which is not limited too much in the present embodiment.

In some embodiments, at least N data blocks having an association relationship with the lost data blocks may be retrieved through the following manner in the present embodiment.

Target index information associated with index information of the lost data blocks is determined according to the index information in the index files stored in the disks; and the at least N data blocks having the association relationship with the lost data blocks are retrieved from the corresponding disks according to disk information in the target index information.

During implementation, as the index information contains the first identification information related to the original data, remaining data blocks belonging to the same original data with the lost data blocks may be determined from the index information, the positions of disks where the remaining data blocks are stored are determined according to the disk information contained in the index information, and the corresponding data blocks are read from the disks at the corresponding positions, thereby recovering the original data by utilizing the remaining data blocks.

Step b, a data recovery operation is performed on the lost data blocks to obtain a maximum of M recovered data blocks by using the at least N data blocks having the association relationship with the lost data blocks.

During implementation, if a maximum of M data blocks are lost, the original data may be recovered by utilizing the remaining data blocks belonging to the same original data, and the lost data blocks are stored in the disks again.

In some embodiments, the data recovery operation may be performed on the lost data blocks by utilizing the erasure code technology, so as to obtain a maximum of M recovered data blocks.

Step c, the maximum of M recovered data blocks are stored in available disks of the single-node server, different recovered data blocks are stored in different disks.

In some embodiments, the recovered data blocks may further be stored into the different disks respectively according to a load balance principle and available storage space of the different disks in the single-node server.

In some embodiments, after the maximum of M recovered data blocks are stored in the available disks of the single-node server, the present embodiment is further used for executing the following flow.

Updating index information of the recovered data blocks before the data recovery operation in the index files according to disk information stored in each recovered data block.

During implementation, since after the data are lost, the lost data blocks will be stored in new disks again after data recovery, in order to guarantee that the index information in the index files is the latest, the disk information of the data blocks at the time when the data are lost needs to be replaced with disk information stored in the recovered data blocks, and thus the index information of the data blocks is updated; and similarly, after a disk is damaged, data stored in the disk are lost, the lost data blocks will be stored in new disks again after data recovery, and thus the disk information in the index information of the lost data blocks is updated to new disk information stored after data recovery.

Figure 9:
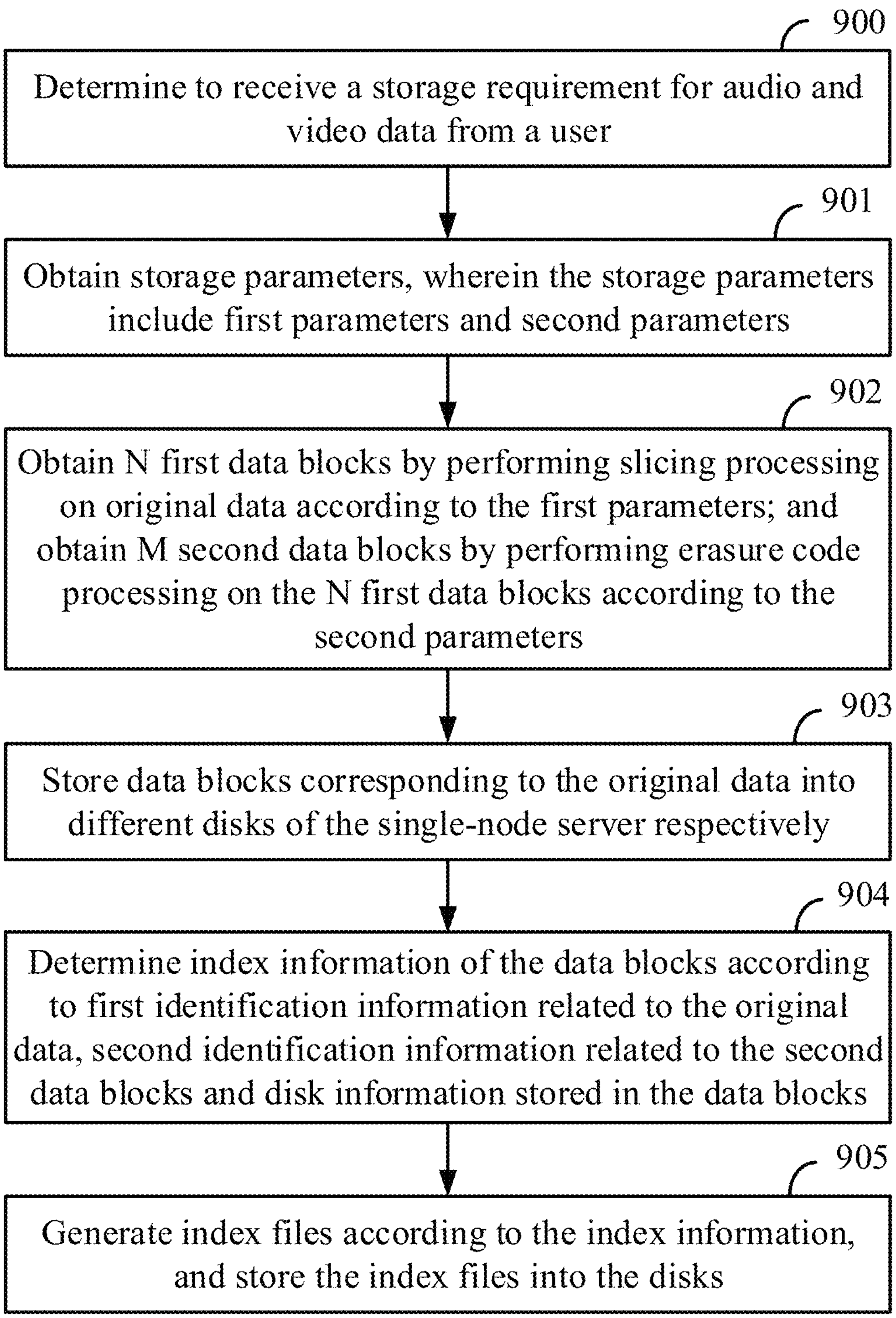
FIG. 9 is an implementation flow diagram of an audio and video data storage solution provided by an embodiment of the present disclosure.

As shown in FIG. 9, an embodiment of the present disclosure provides an implementation flow diagram of an audio and video data storage solution. Specific implementation steps for storing audio and video data on the single-node server are as follows:

Step 900, it is determined to receive a storage requirement for the audio and video data from a user;

Step 901, storage parameters are obtained, the storage parameters include first parameters and second parameters;

Step 902, N first data blocks are obtained by performing slicing processing on original data according to the first parameters; and M second data blocks are obtained by performing erasure code processing on the N first data blocks according to the second parameters;

Step 903, data blocks corresponding to the original data are stored into different disks of the single-node server respectively;

Step 904, index information of the data blocks is determined according to first identification information related to the original data, second identification information related to the second data blocks and disk information stored in the data blocks; and Step 905, index files are generated according to the index information, and the index files are stored into the disks.

Figure 10:
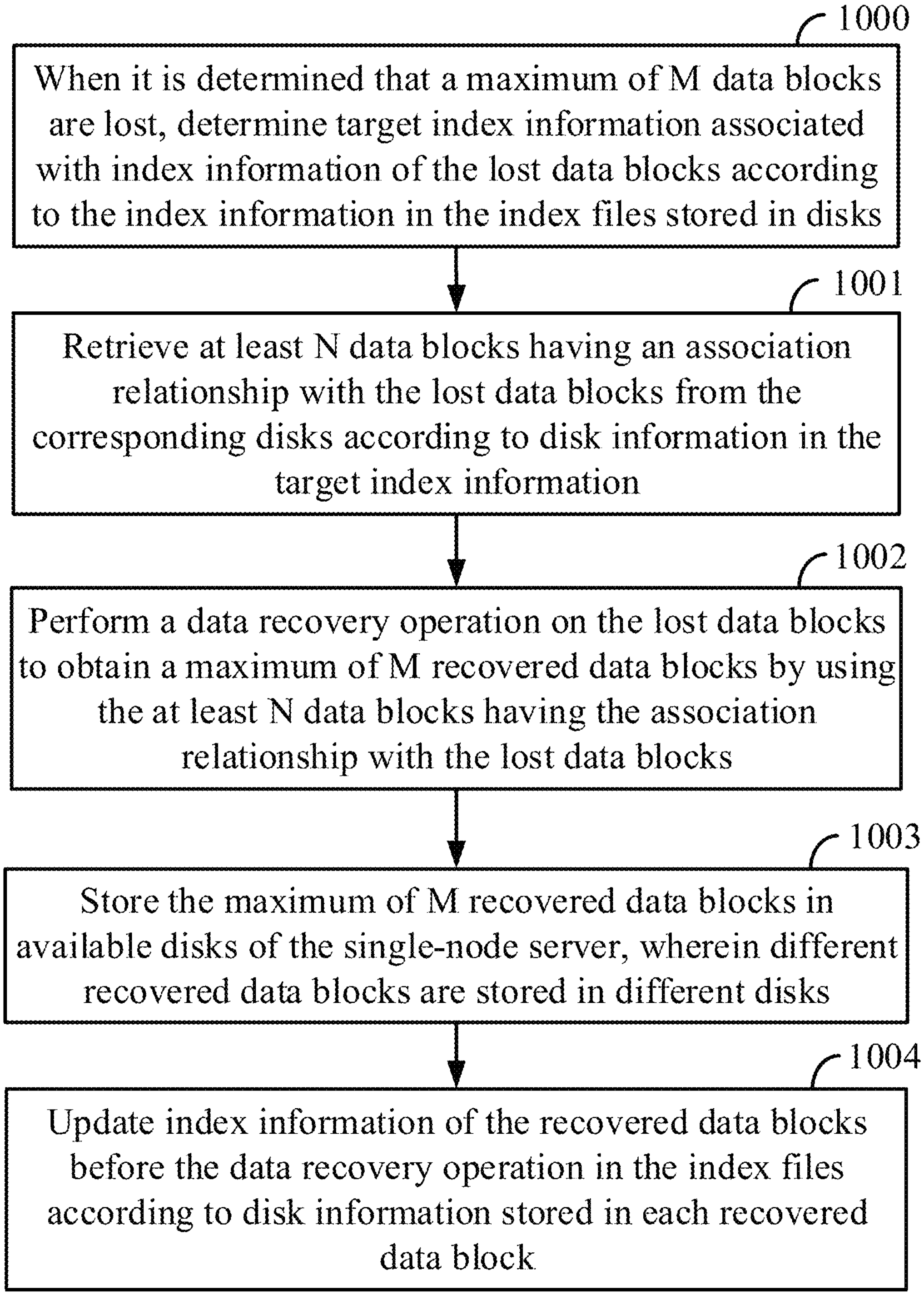
FIG. 10 is an implementation flow diagram of an audio and video data recovery solution provided by an embodiment of the present disclosure.

As shown in FIG. 10, an embodiment of the present disclosure provides an implementation flow diagram of an audio and video data recovery solution. Specific implementation steps for recovering audio and video data on the single-node server are as follows.

Step 1000, when it is determined that a maximum of M data blocks are lost, target index information associated with index information of the lost data blocks is determined according to the index information in the index files stored in disks.

In some embodiments, when it is determined that a disk is damaged, loss of data blocks is determined.

Step 1001, at least N data blocks having an association relationship with the lost data blocks are retrieved from the corresponding disks according to disk information in the target index information.

Step 1002, a data recovery operation is performed on the lost data blocks to obtain a maximum of M recovered data blocks by using the at least N data blocks having the association relationship with the lost data blocks.

Step 1003, the maximum of M recovered data blocks are stored in available disks of the single-node server, different recovered data blocks are stored in different disks.

Step 1004, index information of the recovered data blocks before the data recovery operation in the index files is updated according to disk information stored in each recovered data block.

The present embodiment further provides a management interface. A user may configure the storage parameters correspondingly through the visual management interface, such that the problem such as file loss caused by misoperation of a user in original manners of file configuration or script configurations is effectively avoided. When the user configures the storage parameters, the user can complete the configuration without learning the skills such as script edition, a user without related knowledge may also operate it easily, and a more intelligent management and configuration solution is provided.

In some embodiments, the present embodiment provides the user a more intelligent and portable operating interface through the displayed management interface, which is used for performing related configuration on the storage parameters and other parameters of the single-node server, and a specific flow is as follows.

Figure 11:
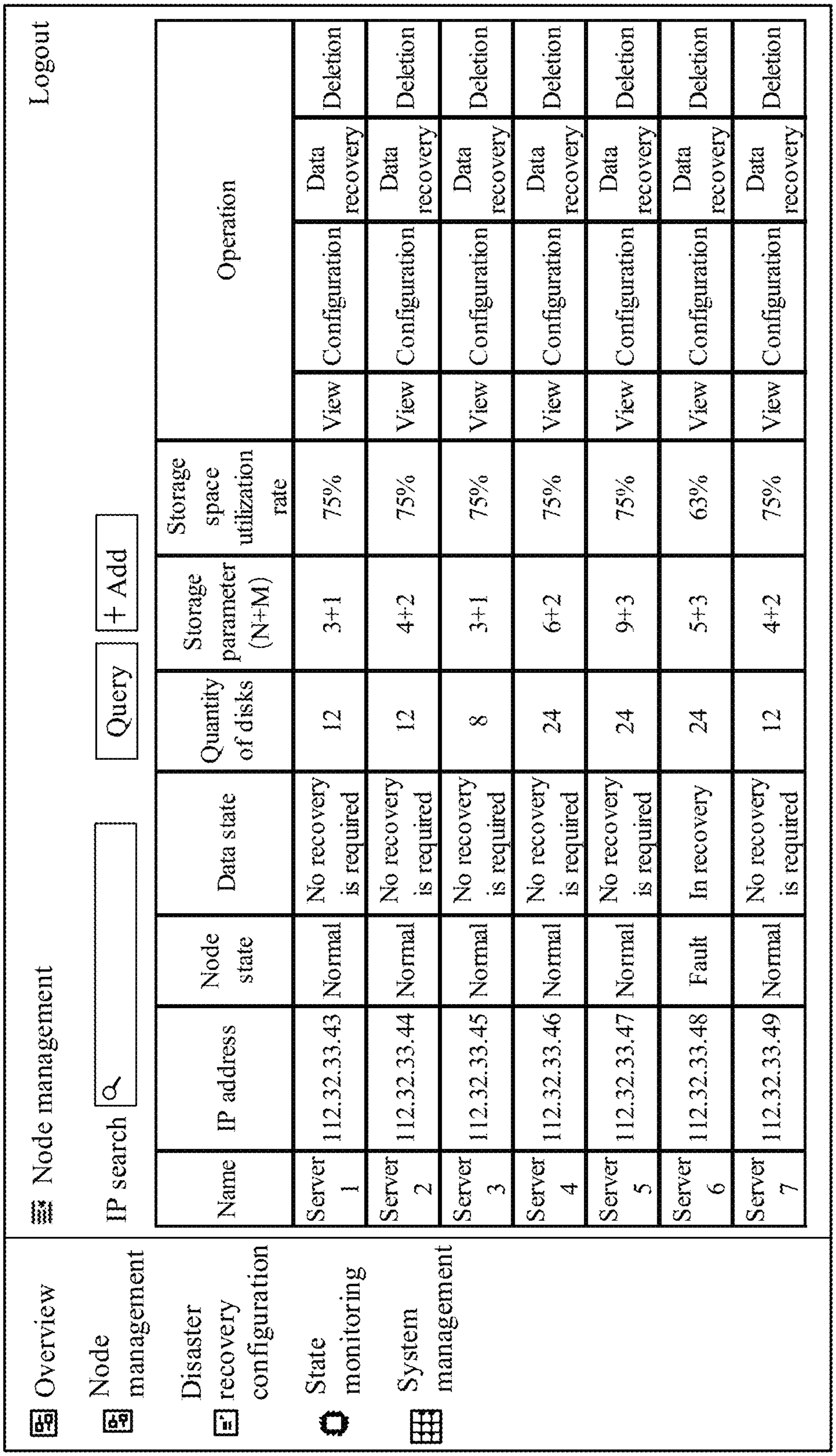
FIG. 11 illustrates a management interface provided by an embodiment of the present disclosure.

A management interface containing at least one single-node server is displayed. During implementation, related content of one or more single-node servers may be displayed on the management interface, as shown in FIG. 11, the present embodiment provides a management interface containing a plurality of single-node servers, and displaying a name, an IP address, a node state, a data state, the quantity of disks, storage parameters (N+M), a storage space utilization rate, and operations (including viewing, configuring, data recovery, deletion, etc.) of each single-node server.

The present embodiment may uniformly manage all single-node servers storing audios and videos, and show a name, an IP address, a state of each single-node server (normal/fault, as long as any single-node server has one or more faulty disks, the single-node server is regarded as being faulty), the quantity of disks (this quantity refers to the quantity of data disks of the single-node server), storage parameters (first parameters+second parameters), a storage space utilization rate, and corresponding operations (query, addition, viewing, configuration modification, deletion, etc.) of each single-node server.

An edition operation executed on configuration parameters of the single-node server by a user through the management interface is received, and at least one operation of adding, modifying, deleting or querying is performed on the configuration parameters corresponding to the edition operation. In some embodiments, the user may add, modify, delete and query any single-node server and its related content on the management interface, or add, modify, delete and query the configuration parameters of any single-node server.

In some embodiments, the configuration parameters of the single-node server include but are not limited to at least one of a name, an IP address, a node state, a data state, the quantity of disks, storage parameters, the total amount of available storage space, or a storage space utilization rate of the single-node server.

In some embodiments, the present embodiment may obtain the storage parameters of at least one single-node server through the following flow, the storage parameters include first parameters and second parameters, and the flow is as follows: the second parameters of the at least one single-node server input by the user through the management interface are received, the second parameters are determined according to business requirements; and the first parameters are determined according to the quantity of available disks and a disk adding cost of the single-node server.

Figure 12:
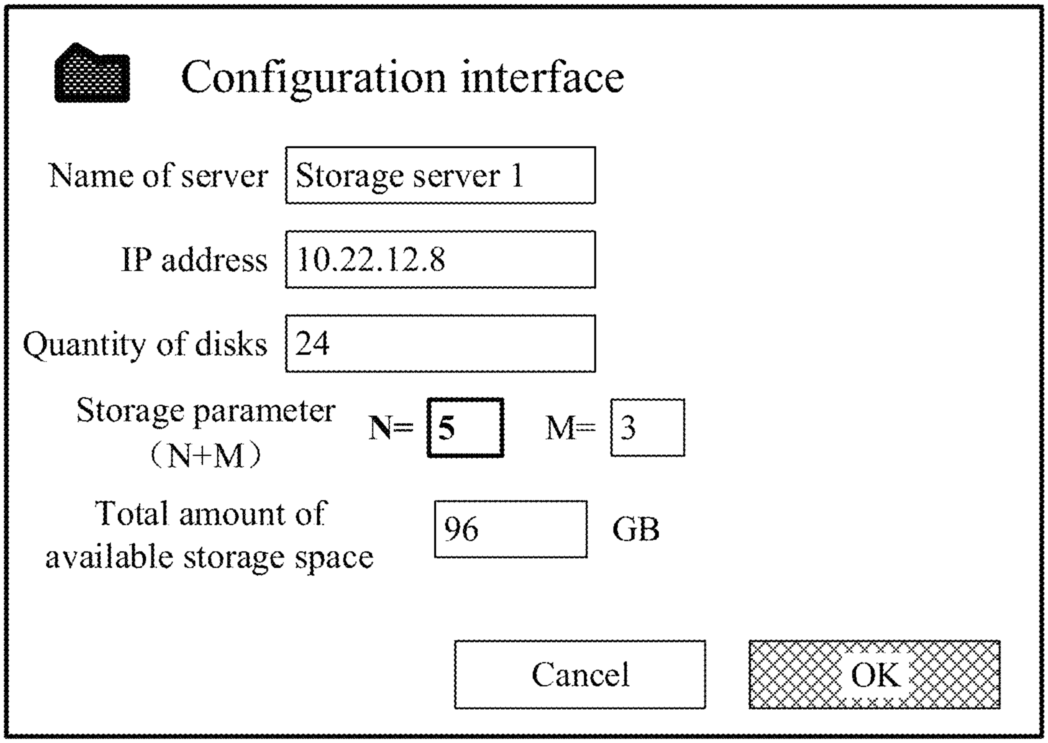
FIG. 12 illustrates a configuration interface of a single-node server provided by an embodiment of the present disclosure.
Figure 13:
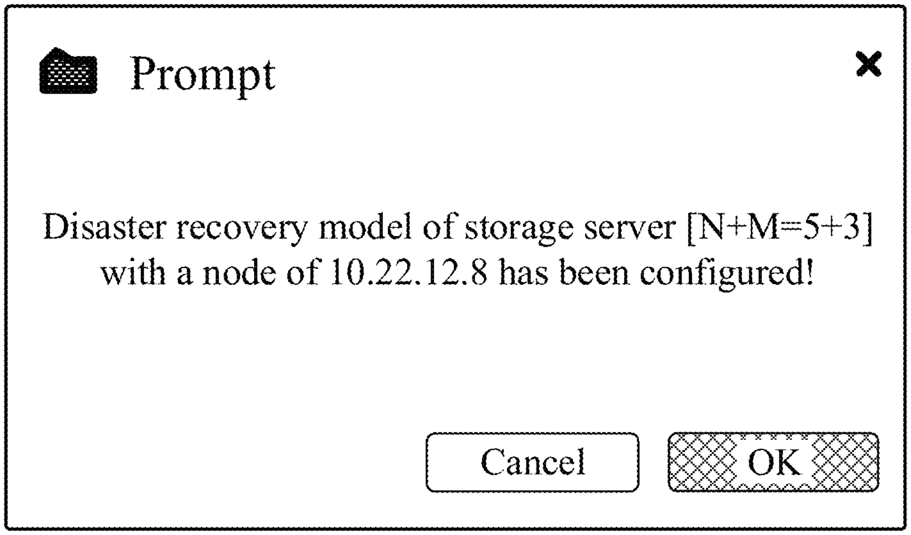
FIG. 13 illustrates a storage parameter configuration completing interface provided by an embodiment of the present disclosure.

As shown in FIG. 12, a configuration interface of a single-node server provided by the present embodiment, when an audio and video storage device or a single-node server is newly added, corresponding configurations need to be performed according to user's requirements, including a name, an IP address, the quantity of disks, storage parameters, the total amount of available storage space and the like of the single-node server. Taking first parameters being N and second parameters being M as an example, a user inputs M=3 of the single-node server, the single-node server automatically calculates N=5 according to the quantity of available disks and the disk adding cost, after the user clicks on an "OK" button, it jumps to a completing interface, as shown in FIG. 13, the present embodiment provides a storage parameter configuration completing interface, which prompts the user that the configuration of the storage parameters of the single-node server has been completed, audio and video data may be stored and recovered according to the storage parameters, and the single-node server will execute and monitor a storage task according to the storage parameters.

Optionally, the user may further click on a "configuration" button of any single-node server on the management interface to enter a configuration interface of the single-node server, thereby performing corresponding operations such as addition, modification and deletion on the configuration parameters of the single-node server.

In some embodiments, as shown in FIG. 14, the present embodiment further provides a state monitoring interface. When the single-node server loses data blocks, a data recovery situation of the lost data blocks is viewed through the state monitoring interface; or, when the single-node server has a disk failure and loses data blocks, a data recovery situation of the lost data blocks is viewed through the state monitoring interface. During implementation, the user may view data recovery states and data recovery progresses of disks in any single-node server through the state monitoring interface, and may further control the beginning and ending of data recovery of each disk manually.

Optionally, if the management interface displays a node state of a certain single-node server being "fault", it indicates that the single-node server has a disk failure and loses data, and the user may click on a "view" button corresponding to the single-node server on the management interface to jump to the state monitoring interface of the single-node server.

Optionally, the state monitoring interface of the single-node server includes basic information (e.g., name, IP address, etc.), disk information (e.g., disk encoding), a data recovery state, a data recovery progress and percentage, and related operations (begin recovery/end recovery) of the single-node server to which each disk belongs.

Figure 15:
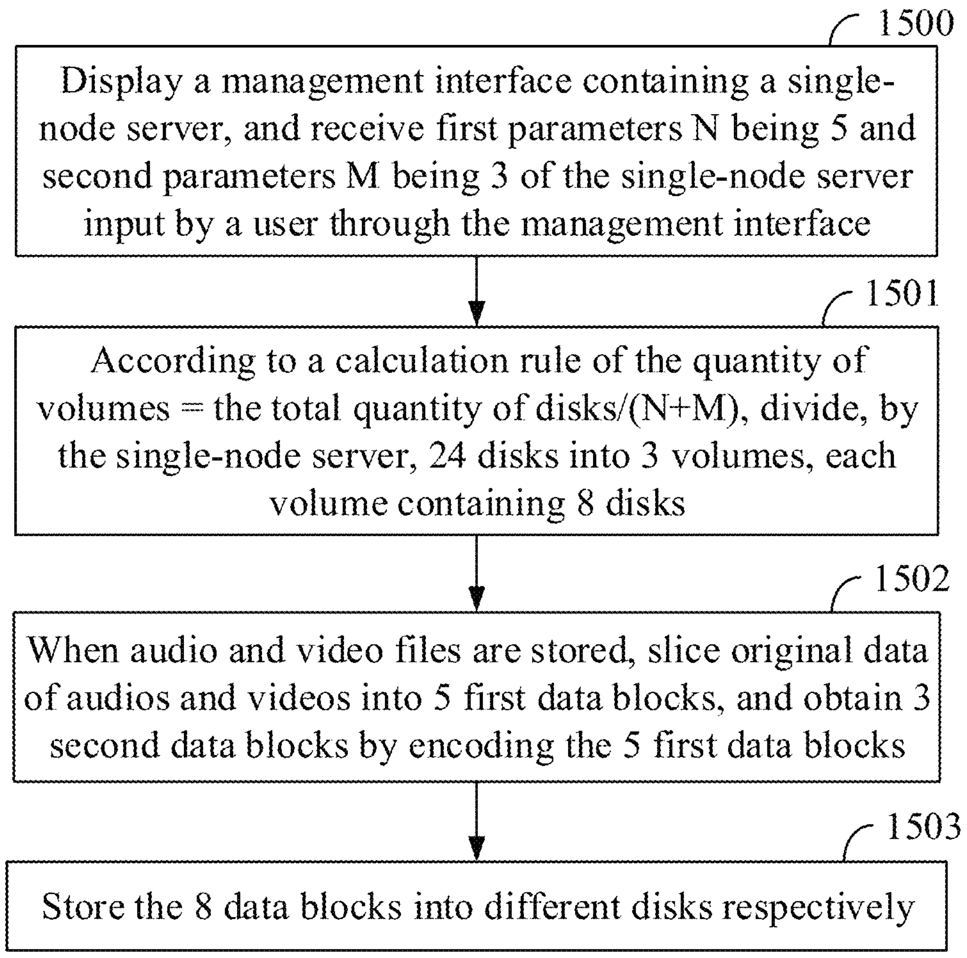
FIG. 15 is a data recovery solution of a single-node server provided by an embodiment of the present disclosure.

As shown in FIG. 15, the present embodiment provides a data recovery solution of a single-node server. A specific implementation flow of the solution is as follows:

Step 1500, a management interface containing a single-node server is displayed, and first parameters N being 5 and second parameters M being 3 of the single-node server input by a user through the management interface are received;

Step 1501, according to a calculation rule of the quantity of volumes=the total quantity of disks/(N+M), the single-node server divides 24 disks into 3 volumes, each volume containing 8 disks, the total quantity of disks of the single-node server is 24;

Step 1502, when audio and video files are stored, original data of audios and videos are sliced into 5 first data blocks, and 3 second data blocks are obtained by encoding the 5 first data blocks;

that is, original data of one audio and video file contain 8 data blocks; and

Step 1503, the 8 data blocks are stored into different disks respectively.

Figure 16:
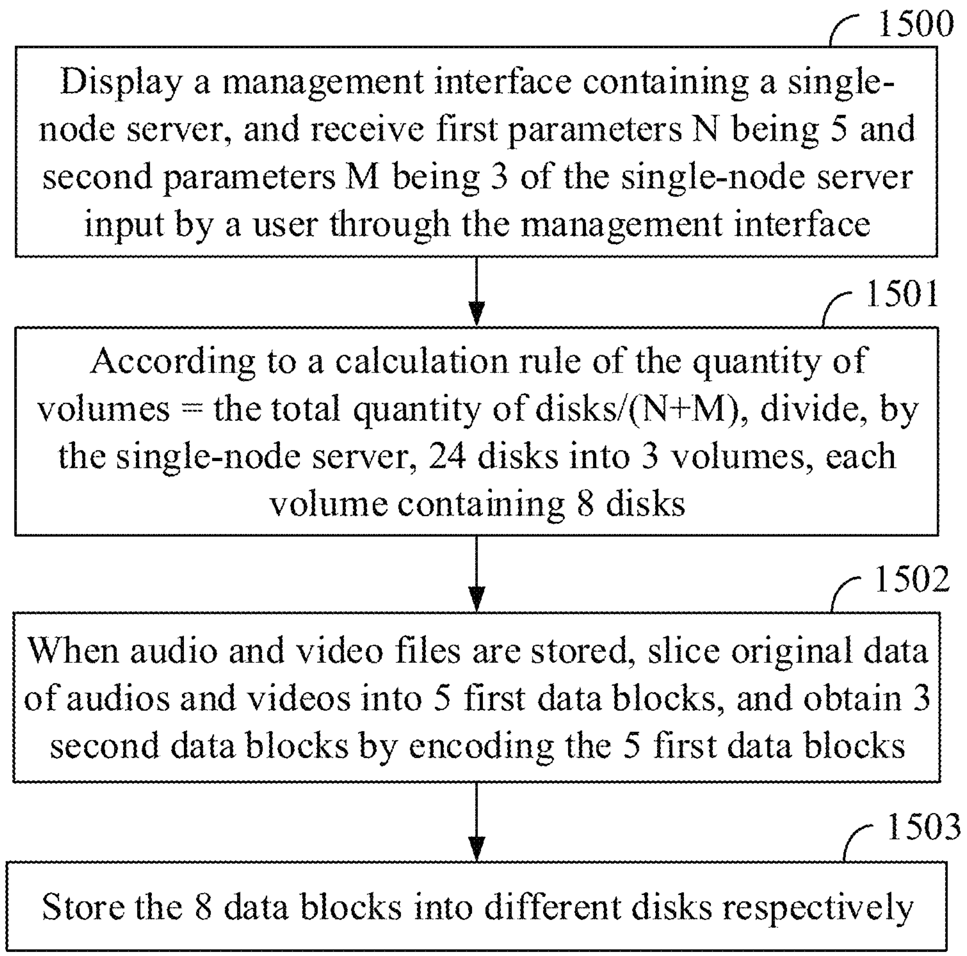
FIG. 16 is a schematic diagram of data block storage provided by an embodiment of the present disclosure.

As shown in FIG. 16, a schematic diagram of data block storage provided by the present embodiment, during implementation, the disks are divided into volumes according to a configuration rule of N+M, where the quantity of the volumes=the quantity of the disks/(N+M). For example, when N=5, M=3, and the quantity of the disks is 24, the quantity of the volumes is equal to 3, each volume containing 8 disks, and the above 8 data blocks may be stored into the 8 disks of volume 1 respectively. N1-N5 represent 5 first data blocks (i.e., original data) obtained by slicing an original audio and video file (i.e., original data), and M1-M3 represent 3 second data blocks (i.e., redundancy data) obtained by encoding.

The data storage method provided by the present embodiment is applied to a video storage project, which can achieve an audio and video data storage solution when there is no RAID card on a single-node server and a motherboard is not equipped with an RAID control chip. In addition, the single-node server in the present embodiment allows the quantity of damaged disks to be greater than or equal to 3, and the original data can still be recovered after the allowed disk damage. The present embodiment provides a multi-level fault-tolerant data storage, reading, and recovery solution for audio and video data storage application environments on a single-node server. The present embodiment solves the problem of weak disaster recovery capabilities of traditional hard RAID solutions (such as RAID5/RAID6) that must rely on specialized RAID card hardware and allow for ≤2 damaged disks on a single-node server. The present embodiment no longer relies on professional RAID card hardware resources and realizes a multi-level disaster recovery storage solution in a software form. Because traditional technologies such as RAID5 and RAID6 rely on a main control chip on a professional RAID card or an onboard RAID chip on a motherboard to achieve data storage disaster recovery strategies, the present embodiment can replace the RAID card by only requiring a server's standard CPU to execute relevant codes of a driver program so as to provide an N+M disaster recovery solution between disks, which effectively saves hardware costs. The present embodiment further meets multi-level disaster recovery requirements for an RAID-like mode, providing multiple levels of audio and video storage data disaster recovery modes such as N+1, N+0, N+2, N+3, and N+M in a single-node server application mode. When the quantity of damaged disks does not exceed M, the present embodiment can ensure that stored data are not lost, providing a higher level of data protection compared to RAID5 and RAID6.

Embodiment 2. Based on the same inventive concept, an embodiment of the present disclosure further provides a single-node server. Since the server is a server in the method in the embodiment of the present disclosure and the principle of solving problems of the server is similar to that of the method, implementation of the server may refer to implementation of the method, and repetitions are omitted.

Figure 17:
FIG. 17 is a schematic diagram of a single-node server provided by an embodiment of the present disclosure.

As shown in FIG. 17, the server includes a processor 1700 and a memory 1701, the memory 1701 is configured to store a program executable by the processor 1700, and the processor 1700 is configured to read the program in the memory 1701 and execute the following steps of:

obtaining storage parameters of at least one single-node server, the storage parameters represent parameters used when slicing processing and encoding processing are performed on original data to be stored;

according to the storage parameters of the single-node server, determining N first data blocks and M second data blocks which are obtained after the original data to be stored are processed, any N data blocks in the N first data blocks and the M second data blocks have an association relationship with M data blocks other than the any N data blocks in the N first data blocks and the M second data blocks, N and M are both positive integers, and M is less than or equal to N; and respectively storing data blocks corresponding to the original data into different disks of the single-node server, the data blocks corresponding to the original data include N first data blocks and M second data blocks.

As an optional implementation, after the respectively storing data blocks corresponding to the original data into different disks of the single-node server, the processor 1700 is further specifically configured to execute:

determining index information of the data blocks corresponding to the original data; and generating index files according to the index information, and storing the index files into the disks.

As an optional implementation, the processor 1700 is specifically configured to execute:

determining the index information of the data blocks according to first identification information related to the original data, second identification information related to the second data blocks and disk information stored in the data blocks.

As an optional implementation, when it is determined that a maximum of M data blocks are lost, the processor 1700 is further specifically configured to execute:

retrieving at least N data blocks having an association relationship with the lost data blocks;

performing a data recovery operation on the lost data blocks to obtain a maximum of M recovered data blocks by using the at least N data blocks having the association relationship with the lost data blocks; and storing the maximum of M recovered data blocks in available disks of the single-node server, different recovered data blocks are stored in different disks.

As an optional implementation, the processor 1700 is specifically configured to execute:

determining target index information associated with index information of the lost data blocks according to the index information in the index files stored in the disks; and retrieving the at least N data blocks having the association relationship with the lost data blocks from the corresponding disks according to disk information in the target index information.

As an optional implementation, after the storing the maximum of M recovered data blocks in available disks of the single-node server, the processor 1700 is further specifically configured to execute:

updating index information of the recovered data blocks before the data recovery operation in the index files according to disk information stored in each recovered data block.

As an optional implementation, the processor 1700 is further specifically configured to execute:

displaying a management interface containing at least one single-node server; and receiving an edition operation executed on configuration parameters of the single-node server by a user through the management interface, and performing at least one operation of adding, modifying, deleting or querying on the configuration parameters corresponding to the edition operation.

As an optional implementation, the storage parameters include first parameters and second parameters, and the processor 1700 is specifically configured to execute:

receiving the second parameters of the at least one single-node server input by the user through the management interface, the second parameters are determined according to business requirements; and determining the first parameters according to the quantity of available disks and a disk adding cost of the single-node server.

As an optional implementation, the configuration parameters include at least one of a name, an IP address, a node state, a data state, the quantity of disks, storage parameters, the total amount of available storage space, or a storage space utilization rate of the single-node server.

As an optional implementation, the processor 1700 is specifically configured to execute:

when the single-node server loses data blocks, viewing a data recovery situation of the lost data blocks through a state monitoring interface; or when the single-node server has a disk failure and loses data blocks, viewing a data recovery situation of the lost data blocks through the state monitoring interface.

As an optional implementation, the storage parameters include first parameters and second parameters, and the processor 1700 is specifically configured to execute:

obtaining the N first data blocks by performing slicing processing on the original data according to the first parameters; and obtaining the M second data blocks by performing encoding processing on the N first data blocks according to the second parameters.

As an optional implementation, the processor 1700 is specifically configured to execute:

obtaining the M second data blocks by performing erasure code processing on the N first data blocks according to the second parameters; wherein the erasure code includes at least one of array erasure codes, RS erasure codes or LDPC erasure codes.

As an optional implementation,

M and N have a following relationship: $M \le (N+1)/2$; and/or, a ratio of a sum of M and N to the quantity of disks of the single-node server is an integer.

As an optional implementation, the processor 1700 is specifically configured to execute:

respectively storing the data blocks corresponding to the original data into the different disks according to a load balance principle and available storage space of the different disks in the single-node server.

Embodiment 3. Based on the same inventive concept, an embodiment of the present disclosure further provides a data storage device. Since the device is a device in the method in the embodiment of the present disclosure and the principle of solving problems of the device is similar to that of the method, implementation of the device may refer to implementation of the method, and repetitions are omitted.

Figure 18:
FIG. 18 is a schematic diagram of a data storage device provided by an embodiment of the present disclosure.

As shown in FIG. 18, the device includes a processor 1800 and a memory 1801, the memory 1801 is configured to store a program executable by the processor 1800, and the processor 1800 is configured to read the program in the memory 1801 and execute the following steps of:

obtaining storage parameters of at least one single-node server, the storage parameters represent parameters used when slicing processing and encoding processing are performed on original data to be stored;

according to the storage parameters of the single-node server, determining N first data blocks and M second data blocks which are obtained after the original data to be stored are processed, any N data blocks in the N first data blocks and the M second data blocks have an association relationship with M data blocks other than the any N data blocks in the N first data blocks and the M second data blocks, N and M are both positive integers, and M is less than or equal to N; and respectively storing data blocks corresponding to the original data into different disks of the single-node server, the data blocks corresponding to the original data include N first data blocks and M second data blocks.

As an optional implementation, after the respectively storing data blocks corresponding to the original data into different disks of the single-node server, the processor 1800 is further specifically configured to execute:

determining index information of the data blocks corresponding to the original data; and generating index files according to the index information, and storing the index files into the disks.

As an optional implementation, the processor 1800 is specifically configured to execute:

determining the index information of the data blocks according to first identification information related to the original data, second identification information related to the second data blocks and disk information stored in the data blocks.

As an optional implementation, when it is determined that a maximum of M data blocks are lost, the processor 1800 is further specifically configured to execute:

retrieving at least N data blocks having an association relationship with the lost data blocks;

performing a data recovery operation on the lost data blocks to obtain a maximum of M recovered data blocks by using the at least N data blocks having the association relationship with the lost data blocks; and storing the maximum of M recovered data blocks in available disks of the single-node server, different recovered data blocks are stored in different disks.

As an optional implementation, the processor 1800 is specifically configured to execute:

determining target index information associated with index information of the lost data blocks according to the index information in the index files stored in the disks; and retrieving the at least N data blocks having the association relationship with the lost data blocks from the corresponding disks according to disk information in the target index information.

As an optional implementation, after the storing the maximum of M recovered data blocks in available disks of the single-node server, the processor 1800 is further specifically configured to execute:

updating index information of the recovered data blocks before the data recovery operation in the index files according to disk information stored in each recovered data block.

As an optional implementation, the processor 1800 is further specifically configured to execute:

displaying a management interface containing at least one single-node server; and receiving an edition operation executed on configuration parameters of the single-node server by a user through the management interface, and performing at least one operation of adding, modifying, deleting or querying on the configuration parameters corresponding to the edition operation.

As an optional implementation, the storage parameters include first parameters and second parameters, and the processor 1800 is specifically configured to execute:

receiving the second parameters of the at least one single-node server input by the user through the management interface, the second parameters are determined according to business requirements; and determining the first parameters according to the quantity of available disks and a disk adding cost of the single-node server.

As an optional implementation, the configuration parameters include at least one of a name, an IP address, a node state, a data state, the quantity of disks, storage parameters, the total amount of available storage space, or a storage space utilization rate of the single-node server.

As an optional implementation, the processor 1800 is specifically configured to execute:

when the single-node server loses data blocks, viewing a data recovery situation of the lost data blocks through a state monitoring interface; or when the single-node server has a disk failure and loses data blocks, viewing a data recovery situation of the lost data blocks through the state monitoring interface.

As an optional implementation, the storage parameters include first parameters and second parameters, and the processor 1800 is specifically configured to execute:

obtaining the N first data blocks by performing slicing processing on the original data according to the first parameters; and obtaining the M second data blocks by performing encoding processing on the N first data blocks according to the second parameters.

As an optional implementation, the processor 1800 is specifically configured to execute:

obtaining the M second data blocks by performing erasure code processing on the N first data blocks according to the second parameters; wherein the erasure code includes at least one of array erasure codes, RS erasure codes or LDPC erasure codes.

As an optional implementation,

M and N have a following relationship: $M \leq (N+1)/2$; and/or, a ratio of a sum of M and N to the quantity of disks of the single-node server is an integer.

As an optional implementation, the processor 1800 is specifically configured to execute:

respectively storing the data blocks corresponding to the original data into the different disks according to a load balance principle and available storage space of the different disks in the single-node server.

Embodiment 4. Based on the same inventive concept, an embodiment of the present disclosure further provides a data storage apparatus. Since the apparatus is an apparatus in the method in the embodiment of the present disclosure and the principle of solving problems of the apparatus is similar to that of the method, based on the same inventive concept, implementation of the apparatus provided by the embodiment of the present disclosure may refer to implementation of the method, and repetitions are omitted.

Figure 19:
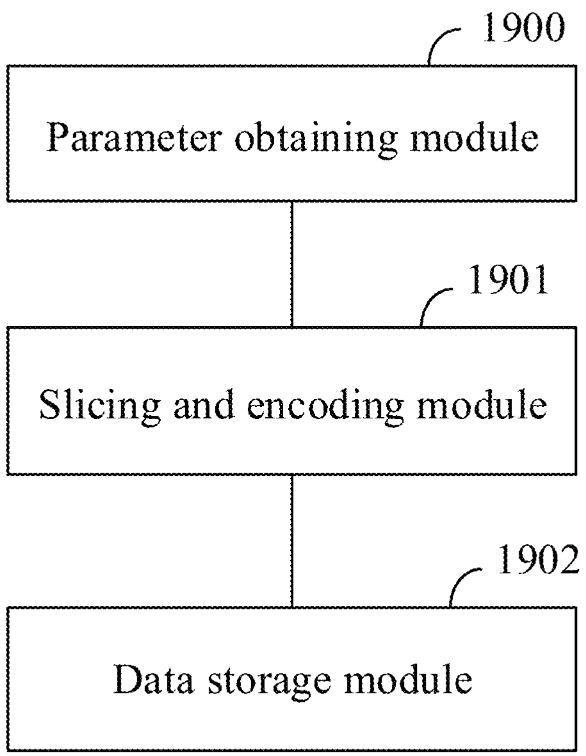
FIG. 19 is a schematic diagram of a data storage apparatus provided by an embodiment of the present disclosure.

As shown in FIG. 19, the apparatus includes:

a parameter obtaining module 1900, configured to obtain storage parameters of at least one single-node server, the storage parameters represent parameters used when slicing processing and encoding processing are performed on original data to be stored;

a slicing and encoding module 1901, configured to, according to the storage parameters of the single-node server, determine N first data blocks and M second data blocks which are obtained after the original data to be stored are processed, any N data blocks in the N first data blocks and the M second data blocks have an association relationship with M data blocks other than the any N data blocks in the N first data blocks and the M second data blocks, N and M are both positive integers, and M is less than or equal to N; and a data storage module 1902, configured to respectively store data blocks corresponding to the original data into different disks of the single-node server, the data blocks corresponding to the original data include N first data blocks and M second data blocks.

As an optional implementation, after the respectively storing data blocks corresponding to the original data into different disks of the single-node server, the data storage module 1902 is further configured to:

determine index information of the data blocks corresponding to the original data; and generate index files according to the index information, and store the index files into the disks.

As an optional implementation, the data storage module 1902 is specifically configured to:

determine the index information of the data blocks according to first identification information related to the original data, second identification information related to the second data blocks and disk information stored in the data blocks.

As an optional implementation, when it is determined that a maximum of M data blocks are lost, the data storage module 1902 is further configured to:

retrieve at least N data blocks having an association relationship with the lost data blocks;

perform a data recovery operation on the lost data blocks to obtain a maximum of M recovered data blocks by using the at least N data blocks having the association relationship with the lost data blocks; and store the maximum of M recovered data blocks in available disks of the single-node server, different recovered data blocks are stored in different disks.

As an optional implementation, the data storage module 1902 is specifically configured to:

determine target index information associated with index information of the lost data blocks according to the index information in the index files stored in the disks; and retrieve the at least N data blocks having the association relationship with the lost data blocks from the corresponding disks according to disk information in the target index information.

As an optional implementation, after the storing the maximum of M recovered data blocks in available disks of the single-node server, the data storage module 1902 is further specifically configured to:

update index information of the recovered data blocks before the data recovery operation in the index files according to disk information stored in each recovered data block.

As an optional implementation, an interaction unit is further included, which is specifically configured to:

display a management interface containing at least one single-node server; and receive an edition operation executed on configuration parameters of the single-node server by a user through the management interface, and perform at least one operation of adding, modifying, deleting or querying on the configuration parameters corresponding to the edition operation.

As an optional implementation, the storage parameters include first parameters and second parameters, and the interaction unit is specifically configured to:

receive the second parameters of the at least one single-node server input by the user through the management interface, the second parameters are determined according to business requirements; and determine the first parameters according to the quantity of available disks and a disk adding cost of the single-node server.

As an optional implementation, the configuration parameters include at least one of a name, an IP address, a node state, a data state, the quantity of disks, storage parameters, the total amount of available storage space, or a storage space utilization rate of the single-node server.

As an optional implementation, the interaction unit is specifically configured to: when the single-node server loses data blocks, view a data recovery situation of the lost data blocks through a state monitoring interface; or when the single-node server has a disk failure and loses data blocks, view a data recovery situation of the lost data blocks through the state monitoring interface.

As an optional implementation, the storage parameters include first parameters and second parameters, and the slicing and encoding module 1901 is specifically configured to:

obtain the N first data blocks by performing slicing processing on the original data according to the first parameters; and obtain the M second data blocks by performing encoding processing on the N first data blocks according to the second parameters.

As an optional implementation, the slicing and encoding module 1901 is specifically configured to:

obtain the M second data blocks by performing erasure code processing on the N first data blocks according to the second parameters;

the erasure code includes at least one of array erasure codes, RS erasure codes or LDPC erasure codes.

As an optional implementation,

M and N have a following relationship: $M \leq (N+1)/2$; and/or, a ratio of a sum of M and N to the quantity of disks of the single-node server is an integer.

As an optional implementation, the data storage module 1902 is specifically configured to:

respectively store the data blocks corresponding to the original data into the different disks according to a load balance principle and available storage space of the different disks in the single-node server.

Based on the same inventive concept, an embodiment of the present disclosure further provides a computer storage medium, storing a computer program thereon, the program, when executed by a processor, implements the following steps of:

obtaining storage parameters of at least one single-node server, the storage parameters represent parameters used when slicing processing and encoding processing are performed on original data to be stored;

according to the storage parameters of the single-node server, determining N first data blocks and M second data blocks which are obtained after the original data to be stored are processed, any N data blocks in the N first data blocks and the M second data blocks have an association relationship with M data blocks other than the any N data blocks in the N first data blocks and the M second data blocks, N and M are both positive integers, and M is less than or equal to N; and respectively storing data blocks corresponding to the original data into different disks of the single-node server, the data blocks corresponding to the original data include N first data blocks and M second data blocks.

Those skilled in the art will appreciate that the embodiments of the present disclosure may be provided as methods, systems, or computer program products. Therefore, the present disclosure may take the form of a full hardware embodiment, a full software embodiment, or an embodiment combining software and hardware. Besides, the present disclosure may adopt the form of a computer program product implemented on one or more computer available storage media (including, but not limited to, a disk memory, an optical memory and the like) containing computer available program codes.

The present disclosure is described with reference to the flow diagrams and/or block diagrams of the method, device (system), and computer program product according to the embodiments of the present disclosure. It should be understood that each flow and/or block in the flow diagrams and/or block diagrams and the combination of flows and/or blocks in the flow diagrams and/or block diagrams can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate a device for implementing the functions specified in one or more flows of the flow diagrams and/or one or more blocks of the block diagrams.

These computer program instructions can also be stored in a computer-readable memory capable of guiding a computer or other programmable data processing devices to work in a specific manner, so that instructions stored in the computer-readable memory generate a manufacturing product including an instruction device, and the instruction device implements the functions specified in one or more flows of the flow diagrams and/or one or more blocks of the block diagrams.

These computer program instructions can also be loaded on a computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow diagrams and/or one or more blocks of the block diagrams.

Apparently, those skilled in the art can make various modifications and variations to the present disclosure without departing from the spirit and scope of the present disclosure. In this way, if these modifications and variations of the present disclosure fall within the scope of the claims of the present disclosure and equivalent technologies thereof, the present disclosure is also intended to include these modifications and variations.

What is claimed is:

1. A data storage method, comprising:

obtaining storage parameters of at least one single-node server, wherein the storage parameters represent parameters used when slicing processing and encoding processing are performed on original data to be stored;

according to the storage parameters of the at least one single-node server, determining N first data blocks and M second data blocks which are obtained after the original data to be stored are processed, wherein any N data blocks in the N first data blocks and the M second data blocks comprise an association relationship with M data blocks other than the any N data blocks in the N first data blocks and the M second data blocks, N and M are both positive integers, and M is less than or equal to N; and respectively storing data blocks corresponding to the original data into different disks of the at least one single-node server, wherein the data blocks corresponding to the original data comprise the N first data blocks and the M second data blocks; and determining index information of the data blocks according to first identification information related to the original data, second identification information related to the M second data blocks and disk information stored in the data blocks.

2. The method according to claim 1, further comprising:

generating index files according to the index information, and storing the index files into the disks.

3. The method according to claim 1, wherein when it is determined that a maximum of M data blocks are lost, the method further comprises:

retrieving at least N data blocks comprising an association relationship with lost data blocks;

performing a data recovery operation on the lost data blocks to obtain a maximum of M recovered data blocks by using the at least N data blocks comprising the association relationship with the lost data blocks; and storing the maximum of M recovered data blocks in available disks of the at least one single-node server, wherein different recovered data blocks are stored in different disks.

4. The method according to claim 3, wherein the retrieving at least N data blocks comprising the association relationship with the lost data blocks comprises:

determining target index information associated with index information of the lost data blocks according to the index information in index files stored in the disks; and retrieving the at least N data blocks comprising the association relationship with the lost data blocks from corresponding disks according to disk information in the target index information.

5. The method according to claim 3, wherein after the storing the maximum of M recovered data blocks in available disks of the at least one single-node server, the method further comprises:

updating index information of the recovered data blocks before the data recovery operation in index files according to disk information stored in each recovered data block.

6. The method according to claim 1, further comprising:

displaying a management interface comprising the at least one single-node server; and receiving an edition operation executed on configuration parameters of the at least one single-node server by a user through the management interface, and performing at least one operation of adding, modifying, deleting or querying on the configuration parameters corresponding to the edition operation.

7. The method according to claim 6, wherein the storage parameters comprise first parameters and second parameters, and the obtaining storage parameters of the at least one single-node server, comprises:

receiving the second parameters of the at least one single-node server which are input by the user through the management interface, wherein the second parameters are determined according to business requirements; and determining the first parameters according to a quantity of available disks and a disk adding cost of the at least one single-node server.

8. The method according to claim 6, wherein the configuration parameters comprise at least one of a name, an IP address, a node state, a data state, a quantity of disks, storage parameters, a total amount of available storage space, or a storage space utilization rate of the at least one single-node server.

9. The method according to claim 6, wherein in response to the at least one single-node server losing data blocks, viewing a data recovery situation of lost data blocks through a state monitoring interface; or in response to the at least one single-node server comprising a disk failure and losing data blocks, viewing a data recovery situation of the lost data blocks through the state monitoring interface.

10. The method according to claim 1, wherein the storage parameters comprise first parameters and second parameters, and the according to the storage parameters of the at least one single-node server, determining the N first data blocks and the M second data blocks which are obtained after the original data to be stored are processed, comprises:

obtaining the N first data blocks by performing slicing processing on the original data according to the first parameters; and obtaining the M second data blocks by performing encoding processing on the N first data blocks according to the second parameters.

11. The method according to claim 10, wherein the obtaining the M second data blocks by performing encoding processing on the N first data blocks according to the second parameters, comprises:

obtaining the M second data blocks by performing erasure code processing on the N first data blocks according to the second parameters; wherein the erasure code comprises at least one of array erasure codes, RS erasure codes or LDPC erasure codes.

12. The method according to claim 1, wherein

M and N comprise a following relationship: $M \leq (N+1)/2$; and/or, a ratio of a sum of M and N to a quantity of disks of the at least one single-node server is an integer.

13. The method according to claim 1, wherein the respectively storing data blocks corresponding to the original data into different disks of the at least one single-node server, comprises:

respectively storing the data blocks corresponding to the original data into the different disks according to a load balance principle and available storage space of the different disks in the at least one single-node server.

14. A single-node server of at least one single-node server, comprising a processor and a memory, wherein the memory is configured to store a program executable by the processor, and the processor is configured to read the program in the memory to perform followings:

obtaining storage parameters of the single-node server, wherein the storage parameters represent parameters used when slicing processing and encoding processing are performed on original data to be stored;

according to the storage parameters of the single-node server, determining N first data blocks and M second data blocks which are obtained after the original data to be stored are processed, wherein any N data blocks in the N first data blocks and the M second data blocks comprise an association relationship with M data blocks other than the any N data blocks in the N first data blocks and the M second data blocks, N and M are both positive integers, and M is less than or equal to N; and respectively storing data blocks corresponding to the original data into different disks of the single-node server, wherein the data blocks corresponding to the original data comprise the N first data blocks and the M second data blocks; and determining index information of the data blocks according to first identification information related to the original data, second identification information related to the M second data blocks and disk information stored in the data blocks.

15. The single-node server according to claim 14, wherein the processor is configured to read the program in the memory to perform followings:

generating index files according to the index information, and storing the index files into the disks.

16. The single-node server according to claim 14, wherein when it is determined that a maximum of M data blocks are lost, the processor is configured to read the program in the memory to perform followings:

retrieving at least N data blocks comprising an association relationship with lost data blocks;

performing a data recovery operation on the lost data blocks to obtain a maximum of M recovered data blocks by using the at least N data blocks comprising the association relationship with the lost data blocks; and storing the maximum of M recovered data blocks in available disks of the single-node server, wherein different recovered data blocks are stored in different disks.

17. The single-node server according to claim 16, wherein the processor is configured to read the program in the memory to receive at least N data blocks comprising the association relationship with the lost data blocks, by:

determining target index information associated with index information of the lost data blocks according to the index information in index files stored in the disks; and retrieving the at least N data blocks comprising the association relationship with the lost data blocks from corresponding disks according to disk information in the target index information.

18. The single-node server according to claim 16, wherein after the storing the maximum of M recovered data blocks in available disks of the single-node server the processor is configured to read the program in the memory to perform followings:

updating index information of the recovered data blocks before the data recovery operation in index files according to disk information stored in each recovered data block.

* * * * *